(12) United States Patent
Wang et al.

(10) Patent No.: US 12,238,303 B2
(45) Date of Patent: Feb. 25, 2025

(54) CODING OF INSTANTANEOUS DECODING REFRESH SUBPICTURES

(71) Applicant: Bytedance Inc., Los Angeles, CA (US)

(72) Inventors: Ye-kui Wang, San Diego, CA (US); Li Zhang, San Diego, CA (US); Kai Zhang, San Diego, CA (US)

(73) Assignee: BYTEDANCE INC., Los Angeles, CA (US)

(*) Notice: Subject to any disclaimer, the term of this patent is extended or adjusted under 35 U.S.C. 154(b) by 0 days.

(21) Appl. No.: 17/964,396

(22) Filed: Oct. 12, 2022

(65) Prior Publication Data

US 2023/0063887 A1     Mar. 2, 2023

Related U.S. Application Data

(63) Continuation of application No. PCT/US2021/026534, filed on Apr. 9, 2021.
(Continued)

(51) Int. Cl.
*H04N 19/105*   (2014.01)
*G06T 7/33*   (2017.01)
(Continued)

(52) U.S. Cl.
CPC ............. *H04N 19/172* (2014.11); *G06T 7/33* (2017.01); *G06T 7/73* (2017.01); *H04N 19/105* (2014.11);
(Continued)

(58) Field of Classification Search
None
See application file for complete search history.

(56) References Cited

U.S. PATENT DOCUMENTS

2005/0180512 A1   8/2005   Narasimhan et al.
2014/0355692 A1   12/2014  Ramasubramonian et al.
(Continued)

FOREIGN PATENT DOCUMENTS

JP   7529794 B2   8/2024

OTHER PUBLICATIONS

Document: JVET-Q2001-vE, Bross, B., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 512 pages.

(Continued)

*Primary Examiner* — Christopher G Findley
(74) *Attorney, Agent, or Firm* — Astute IP Law Group

(57) ABSTRACT

Methods and apparatus for video processing are described. The processing may include video encoding, video decoding, or video transcoding. An example video processing method includes performing a conversion between a video including one or more pictures including one or more subpictures and a bitstream of the video. The one or more pictures and/or the one or more subpictures are included into the bitstream according to an order rule. The order rule specifies a relationship between a position of a current instantaneous decoder refresh (IDR) picture or a current IDR subpicture in the bitstream with respect to another picture referred to by an entry in a reference picture list for a current slice of the current IDR picture or the current IDR subpicture.

20 Claims, 17 Drawing Sheets

Related U.S. Application Data

(60) Provisional application No. 63/008,799, filed on Apr. 12, 2020.

(51) Int. Cl.

| | | |
|---|---|---|
| *G06T 7/73* | (2017.01) | |
| *H04N 19/107* | (2014.01) | |
| *H04N 19/136* | (2014.01) | |
| *H04N 19/169* | (2014.01) | |
| *H04N 19/172* | (2014.01) | |
| *H04N 19/174* | (2014.01) | |
| *H04N 19/30* | (2014.01) | |
| *H04N 19/70* | (2014.01) | |

(52) U.S. Cl.
CPC ......... *H04N 19/107* (2014.11); *H04N 19/136* (2014.11); *H04N 19/174* (2014.11); *H04N 19/188* (2014.11); *H04N 19/30* (2014.11); *H04N 19/70* (2014.11); *G06T 2207/10072* (2013.01); *G06T 2207/20021* (2013.01); *G06T 2207/20104* (2013.01); *G06T 2207/30061* (2013.01); *G06T 2207/30101* (2013.01); *G06T 2207/30172* (2013.01)

(56) References Cited

U.S. PATENT DOCUMENTS

| | | |
|---|---|---|
| 2016/0212437 A1 | 7/2016 | Tsukuba et al. |
| 2016/0255359 A1 | 9/2016 | Yu et al. |
| 2017/0134742 A1 | 5/2017 | Deshpande |
| 2018/0277164 A1 | 9/2018 | Wang |
| 2018/0295382 A1 | 10/2018 | Liu et al. |
| 2019/0068964 A1 | 2/2019 | Kadono et al. |
| 2020/0053392 A1 | 2/2020 | Hannuksela |
| 2022/0094909 A1 | 3/2022 | Hannuksela et al. |
| 2022/0132148 A1* | 4/2022 | Wang .................. H04N 19/188 |

OTHER PUBLICATIONS

Document: JVET-R0052-v1, Hsiang, S., et al., "AHG9: Overhead reduction for picture header and slice header," Joint Video Experts Team (JVET) of ITU-T SG 16 WP 3 and ISO/IEC JTC 1/SC 29/WG 11 18th Meeting: by teleconference, Apr. 15-24, 2020, 13 pages.
Document: JVET-R0151-v3, Sauer, J., "AHG6/AHG12: Uncoded subpictures and potential applications," Joint Video Experts Team (JVET) of ITU-T SG 16 WP 3 and ISO/IEC JTC 1/SC 29/WG 11 18th Meeting: by teleconference, Apr. 15-24, 2020, 12 pages.
Document: JVET-R0191-r1, Hendry, et al., "AHG9: On miscellaneous updates for HLS signalling," Joint Video Experts Team (JVET) of ITU-T SG 16 WP 3 and ISO/IEC JTC 1/SC 29/WG 11 18th Meeting: by teleconference, Apr. 15-24, 2020, 5 pages.
Document: JVET-R0267, He, Y., et al., "AHG9/AHG12: On mixed NAL unit types," Joint Video Experts Team (JVET) of ITU-T SG 16 WP 3 and ISO/IEC JTC 1/SC 29/WG 11 18th Meeting: by teleconference, Apr. 15-24, 2020, 7 pages.
Document: JVET-R0042-v1, Wang, Y., "AHG8/AHG9/AHG12: On mixed subpicture types within a picture," Joint Video Experts Team (JVET) of ITU-T SG 16 WP 3 and ISO/IEC JTC 1/SC 29/WG 11 18th Meeting: by teleconference, Apr. 15-24, 2020, 10 pages.
Document: JVET-R0065-v1, Wang, Y., "AHG8/AHG9: On IRAP and GDR AUs," Joint Video Experts Team (JVET) of ITU-T SG 16 WP 3 and ISO/IEC JTC 1/SC 29/WG 11 18th Meeting: by teleconference, Apr. 15-24, 2020, 3 pages.
Document: JVET-R0063-v1, Zhang, L., et al., "AHG9: Signalling of LMCS control," Joint Video Experts Team (JVET) of ITU-T SG 16 WP 3 and ISO/IEC JTC 1/SC 29/WG 11 18th Meeting: by teleconference, Apr. 15-24, 2020, 4 pages.
Document: JVET-R0064-v1, Wang, Y., et al., "AHG9: Signalling of scaling list control," Joint Video Experts Team (JVET) of ITU-T SG 16 WP 3 and ISO/IEC JTC 1/SC 29/WG 11 18th Meeting: by teleconference, Apr. 15-24, 2020, 4 pages.
Document: JVET-G1001-v1, Chen, J., et al., "Algorithm Description of Joint Exploration Test Model 7 (JEM 7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.
"Series H: Audiovisual and Multimedia Systems Infrastructure of audiovisual services—Coding of moving video, High efficiency video coding," Recommendation ITU-T H.265 | ISO/IEC 23008-2 (in force edition), Nov. 2019, 712 pages.
Document: JVET-Q2002-v3, Chen, J., et al., "Algorithm description for Versatile Video Coding and Test Model 8 (VTM 8)," Joint Video Experts Team (JVET) of ITU-T SG 16 WP 3 and ISO/IEC JTC 1/SC 29/WG 11 17th Meeting: Brussels, BE, Jan. 7-17, 2020, 97 pages.
Bossen, F., Retrieved from the internet: https://vcgit.hhi.fraunhofer.de/jvet/VVCSoftware_VTM.git, VTM software, Oct. 18, 2022, 3 pages.
Schierl, T., et al., "System Layer Integration of High Efficiency Video Coding," IEEE Translations on Circuits and Systems for Video Technology, vol. 22, No. 12, Dec. 2012, 14 pages.
Foreign Communication From A Related Counterpart Application, PCT Application No. PCT/US2021/025351, International Search Report dated Aug. 17, 2021, 17 pages.
Foreign Communication From A Related Counterpart Application, PCT Application No. PCT/US2021/026534, International Search Report dated Sep. 10, 2021, 33 pages.

* cited by examiner

700 →

702 — Performing a conversion between a video comprising one or more pictures comprising one or more subpictures and a bitstream of the video, and
wherein the one or more pictures and/or the one or more subpictures are included into the bitstream according to an order rule, and
wherein the order rule specifies a relationship between a position of a current instantaneous decoder refresh (IDR) picture or a current IDR subpicture in the bitstream with respect to another picture referred to by an entry in a reference picture list for a current slice of the current IDR picture or the current IDR subpicture.

FIG. 7A

710

712

Performing a conversion between a video comprising one or more pictures comprising one or more subpictures and/or one or more slices and a bitstream of the video according to a format rule, and
wherein the format rule allows an inclusion of an indication of an access unit indicating whether the access unit is an intra random access point (IRAP) access unit or a gradual decoding refresh (GDR) access unit for each access unit in the video.

722 — Performing a conversion between a video comprising one or more pictures comprising one or more subpictures and/or one or more slices and a bitstream of the video according to a format rule, and wherein the format rule specifies that an indication of whether a slice type is allowed in a picture is selectively included in the bitstream based on a picture condition of the picture.

Performing a conversion between a video comprising one or more pictures and a bitstream of the video according to a format rule, and
wherein the format rule specifies that whether and/or how to signal an indication of filter present flags and/or filter coefficients depends on previously coded information with an adaptive loop filtering data structure and/or syntax elements in an adaptation parameter set RBSP (raw byte sequence payload) syntax. —742

752 — Performing a conversion between a video comprising one or more pictures and a bitstream of the video according to a format rule, and wherein the format rule allows, for a video region smaller than a picture, to refer to multiple adaptation parameter sets (APSs) corresponding to coding tools whose side information is included in the APSs.

760

Performing a conversion between a video comprising one or more pictures comprising one or more subpictures and a bitstream of the video according to a format rule, and wherein the format rule specifies how to infer a value of a first variable indicating whether a subpicture of a coded picture is treated as a picture in a decoding process excluding in-loop filtering operations depends on a second variable indicating a presence of subpicture information in the bitstream. —762

Performing a conversion between a video comprising one or more pictures comprising one or more subpictures and a bitstream of the video according to a format rule, and wherein the format rule specifies that, in response to one or more conditions being satisfied, a variable indicating an applicability of a deblocking filter to pictures referring to a picture parameter set has a first value to indicate that the deblocking filter is applied to slices referring to the picture parameter set or a second value to indicate that the deblocking filter is disabled to a slice referring to the picture parameter set.

Performing a conversion between a video comprising one or more video units comprising one or more slices and a bitstream of the video according to a format rule, and wherein the format rule specifies that a quantization parameter offset value used for a joint chroma residual coding is included in one or more video unit levels that are larger than a slice level. —782

790 →

┌─────────────────────────────────────────────┐
│ Performing a conversion between a video comprising one or │
│ more pictures and a bitstream of the video according to a │
│ format rule, and wherein the format rule specifies (i) a fixed │
│ or variable length of one or more bits used to code a │
│ variable indicating a LMCS (luma mapping with chroma │
│ scaling) mode identification in a picture header level, and (ii) │
│ a range of a value of the variable.          │
└─────────────────────────────────────────────┘ — 792

FIG. 7J

CODING OF INSTANTANEOUS DECODING REFRESH SUBPICTURES

CROSS REFERENCE TO RELATED APPLICATIONS

This application is a continuation of International Patent Application No. PCT/US2021/026534 filed on Apr. 9, 2021, which claims the priority to and benefits of U.S. Provisional Patent Application No. 63/008,799 filed on Apr. 12, 2020. All the aforementioned patent applications are hereby incorporated by reference in their entireties.

TECHNICAL FIELD

The present disclosure relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present disclosure discloses techniques that can be used by video encoders and decoders for processing coded representation of video using control information useful for decoding of the coded representation.

In one example aspect, a video processing method is disclosed. The method includes performing a conversion between a video comprising one or more layers comprising one or more video regions and a coded representation of the video according to a format rule, wherein the format rule specifies that one or more syntax elements are included in the coded representation at the one or more video region level corresponding to allowed slice types for a corresponding video region.

In another example aspect, another video processing method is disclosed. The method includes performing a conversion between a video comprising one or more layers comprising one or more video pictures comprising one or more video slices and a coded representation of the video according to a format rule, wherein the format rule specifies that syntax elements related to enablement or use of a coding mode at a slice level are included at most once between either a picture header or a slice header according to a second rule.

In another example aspect, another video processing method is disclosed. The method includes performing a conversion between a video comprising one or more video pictures comprising one or more video slices and a coded representation of the video according to a format rule, wherein the format rule specifies that allowed slice types in a video picture controls whether a reference picture list is signaled in or generatable from the coded representation.

In another example aspect, another video processing method is disclosed. The method includes performing a conversion between a video comprising one or more video pictures comprising one or more subpictures wherein the coded representation conforms to a format rule, wherein the format rule specifies a processing of a noncoded subpicture of a video picture.

In another example aspect, another video processing method is disclosed. The method includes performing a conversion between a video comprising one or more pictures comprising one or more subpictures and a bitstream of the video, wherein the one or more pictures and/or the one or more subpictures are included into the bitstream according to an order rule, wherein the order rule specifies a relationship between a position of a current instantaneous decoder refresh (IDR) picture or a current IDR subpicture in the bitstream with respect to another picture referred to by an entry in a reference picture list for a current slice of the current IDR picture or the current IDR subpicture.

In another example aspect, another video processing method is disclosed. The method includes performing a conversion between a video comprising one or more pictures comprising one or more subpictures and/or one or more slices and a bitstream of the video according to a format rule, and wherein the format rule allows an inclusion of an indication of an access unit indicating whether the access unit is an intra random access point (IRAP) access unit or a gradual decoding refresh (GDR) access unit for each access unit in the video.

In another example aspect, another video processing method is disclosed. The method includes performing a conversion between a video comprising one or more pictures comprising one or more subpictures and/or one or more slices and a bitstream of the video according to a format rule, and wherein the format rule specifies that an indication of whether a slice type is allowed in a picture is selectively included in the bitstream based on a picture condition of the picture.

In another example aspect, another video processing method is disclosed. The method includes performing a conversion between a video comprising one or more pictures comprising one or more subpictures and/or one or more slices and a bitstream of the video, wherein the format rule specifies that one of at least two or four syntax elements is set to a particular value for an ALF (adaptive loop filter) adaptation parameter set.

In another example aspect, another video processing method is disclosed. The method includes performing a conversion between a video comprising one or more pictures and a bitstream of the video according to a format rule, and wherein the format rule specifies that whether and/or how to signal an indication of filter present flags and/or filter coefficients depends on previously coded information with an adaptive loop filtering data structure and/or syntax elements in an adaptation parameter set RBSP (raw byte sequence payload) syntax.

In another example aspect, another video processing method is disclosed. The method includes performing a conversion between a video comprising one or more pictures and a bitstream of the video according to a format rule, and wherein the format rule allows, for a video region smaller than a picture, to refer to multiple adaptation parameter sets (APSs) corresponding to coding tools whose side information is included in the APSs.

In another example aspect, another video processing method is disclosed. The method includes performing a conversion between a video comprising one or more pictures comprising one or more subpictures and a bitstream of the video according to a format rule, and wherein the format rule specifies how to infer a value of a first variable indicating whether a subpicture of a coded picture is treated as a picture in a decoding process excluding in-loop filtering operations depends on a second variable indicating a presence of subpicture information in the bitstream.

In another example aspect, another video processing method is disclosed. The method includes performing a conversion between a video comprising one or more pictures comprising one or more subpictures and a bitstream of the video according to a format rule, and wherein the format rule specifies that, in response to one or more conditions being satisfied, a variable indicating an applicability of a deblocking filter to pictures referring to a picture parameter set has a first value to indicate that the deblocking filter is applied to slices referring to the picture parameter set or a second value to indicate that the deblocking filter is disabled to a slice referring to the picture parameter set.

In another example aspect, another video processing method is disclosed. The method includes performing a conversion between a video comprising one or more video units comprising one or more slices and a bitstream of the video according to a format rule, wherein the format rule specifies that a quantization parameter offset value used for a joint chroma residual coding is included in one or more video unit levels that are larger than a slice level.

In another example aspect, another video processing method is disclosed. The method includes performing a conversion between a video comprising one or more pictures and a bitstream of the video according to a format rule, and wherein the format rule specifies (i) a fixed or variable length of one or more bits used to code a variable indicating a LMCS (luma mapping with chroma scaling) mode identification in a picture header level, and (ii) a range of a value of the variable.

In another example aspect, another video processing method is disclosed. The method includes performing a conversion between a video comprising one or more pictures and a bitstream of the video according to a format rule, and wherein the format rule specifies (i) a fixed or variable length of one or more bits used to code a variable indicating a scaling list mode identification in a picture header level, and (ii) a range of a value of the variable.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclose. The code embodies one of the methods described herein in the form of processor-executable code.

These, and other, features are described throughout the present disclosure.

BRIEF DESCRIPTION OF DRAWINGS

FIGS. 7A to 7K are flowcharts for example methods of video processing based on some implementations of the disclosed technology.

DETAILED DESCRIPTION

Figure 1:
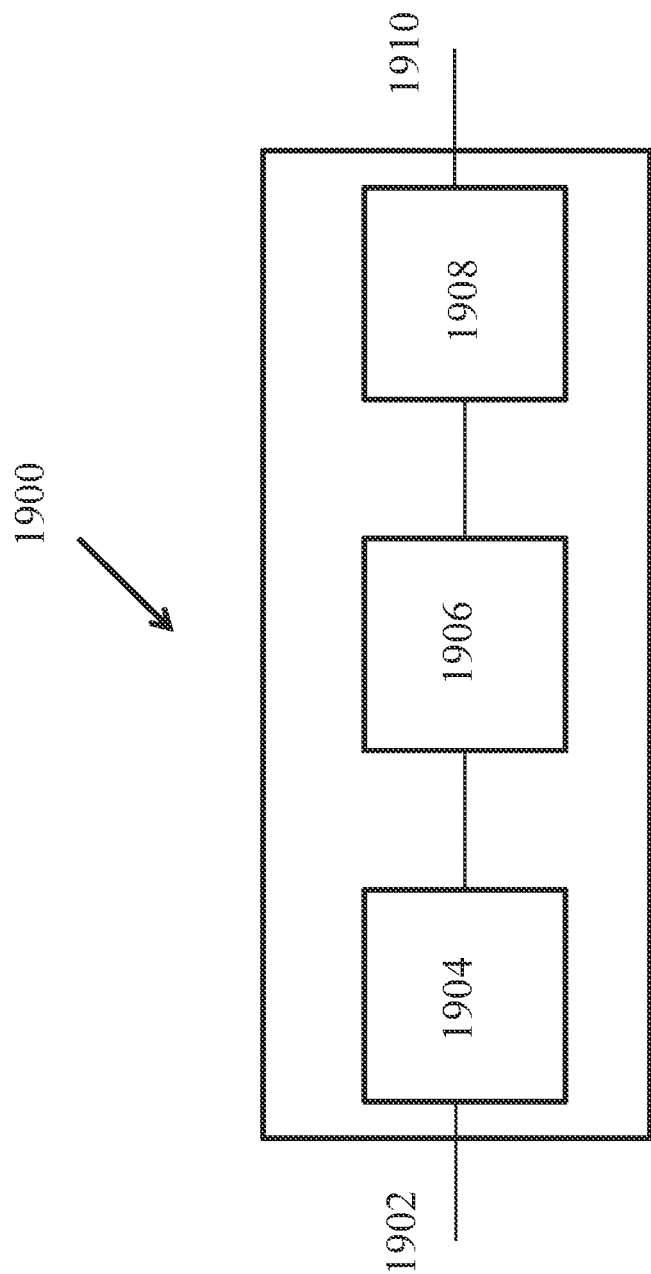
FIG. 1 is a block diagram of an example video processing system.

Section headings are used in the present disclosure for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also. In this disclosure, certain embodiments are shown as changes to the current Versatile Video Coding (VVC) specification in which new text is added showing in Courier New font and deleted text are marked with double brackets (e.g., [[a]] denotes the deletion of the character 'a').

1. Introduction

This disclosure is related to video coding technologies. Specifically, it is about improvements on signalling of allowed slice types and related coding tools that are only applicable to bi-predicted slices, and support of non-coded subpictures. The ideas may be applied individually or in various combination, to any video coding standard or non-standard video codec that supports multi-layer video coding, e.g., the being-developed VVC.

2. Abbreviations

ALF Adaptive Loop Filter
APS Adaptation Parameter Set
AU Access Unit
AUD Access Unit Delimiter
AVC Advanced Video Coding
CLVS Coded Layer Video Sequence
CPB Coded Picture Buffer
CRA Clean Random Access
CTU Coding Tree Unit
CVS Coded Video Sequence
CVSS Coded Video Sequence Start
DCI Decoding Capability Information
DPB Decoded Picture Buffer
DU Decoding Unit
EOB End Of Bitstream
EOS End Of Sequence
GDR Gradual Decoding Refresh
HEVC High Efficiency Video Coding
HRD Hypothetical Reference Decoder
ID Identifier
IDR Instantaneous Decoding Refresh
IRAP Intra Random Access Point
JEM Joint Exploration Model
LMCS Luma Mapping with Chroma Scaling
LSB Least Significant Bits
MCTS Motion-Constrained Tile Sets
MSB Most Significant Bits
NAL Network Abstraction Layer
NUT NAL Unit Type
OLS Output Layer Set
OMAF Omnidirectional Media Format
PH Picture Header
POC Picture Order Count
PPS Picture Parameter Set PTL Profile, Tier and Level
PU Picture Unit
QP Quantization Parameter
RADL Random Access Decodable Leading (Picture)
RAP Random Access Point
RASL Random Access Skipped Leading (Picture)
RBSP Raw Byte Sequence Payload
RPL Reference Picture List
RPS Reference Picture Set
SAO Sample Adaptive Offset
SEI Supplemental Enhancement Information
SPS Sequence Parameter Set
STSA Step-wise Temporal Sublayer Access
SVC Scalable Video Coding
VCL Video Coding Layer
VPS Video Parameter Set
VTM VVC Test Model
VUI Video Usability Information
VVC Versatile Video Coding
WPP Wavefront Parallel Processing 3. Initial Discussion Video coding standards have evolved primarily through the development of the well-known International Telecommunication Union-Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, the Joint Video Exploration Team (JVET) was founded by Video Coding Experts Group (VCEG) and MPEG jointly in 2015. Since then, many new methods have been adopted by JVET and put into the reference software named Joint Exploration Model (JEM). The JVET meeting is concurrently held once every quarter, and the new coding standard is targeting at 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The latest VVC working draft, JVET-Q2001_vE, could be downloaded from: http://phenix.it-sudparis.eu/jvet/doc_end_user/documents/17_Brussels/wg11/JVET-Q2001-v15.zip The VVC project is now aiming for technical completion (FDIS) at the July 2020 meeting.

3.1. Parameter Sets

AVC, HEVC, and VVC specify parameter sets. The types of parameter sets include SPS, PPS, APS, and VPS. SPS and PPS are supported in all of AVC, HEVC, and VVC. VPS was introduced since HEVC and is included in both HEVC and VVC. APS was not included in AVC or HEVC but is included in the latest VVC draft text.

SPS was designed to carry sequence-level header information, and PPS was designed to carry infrequently changing picture-level header information. With SPS and PPS, infrequently changing information need not to be repeated for each sequence or picture, hence redundant signalling of this information can be avoided. Furthermore, the use of SPS and PPS enables out-of-band transmission of the important header information, thus not only avoiding the need for redundant transmissions but also improving error resilience.

VPS was introduced for carrying sequence-level header information that is common for all layers in multi-layer bitstreams.

APS was introduced for carrying such picture-level or slice-level information that needs quite some bits to code, can be shared by multiple pictures, and in a sequence there can be quite many different variations.

3.1.1. Video Parameter Set (VPS)

The syntax table and semantics of multiple syntax elements in the latest VVC draft text (JVET-Q2001-vE/v15) are defined as follows:

7.3.2.2 Video Parameter Set RBSP Syntax

| | Descriptor |
|---|---|
| video_parameter_set_rbsp( ) { | |
|   vps_video_parameter_set_id | u(4) |
|   vps_max_layers_minus1 | u(6) |
|   vps_max_sublayers_minus1 | u(3) |
|   if( vps_max_layers_minus1 > 0 && vps_max_sublayers_minus1 > 0 ) | |
|     vps_all_layers_same_num_sublayers_flag | u(1) |
|   if( vps_max_layers_minus1 > 0 ) | |
|     vps_all_independent_layers_flag | u(1) |
| ... | |
|   if( !vps_all_independent_layers_flag ) | |
|     vps_num_dpb_params | ue(v) |
|   if( vps_num_dpb_params > 0 && vps_max_sublayers_minus1 > 0 ) | |
|     vps_sublayer_dpb_params_present_flag | u(1) |
|   for( i = 0; i < vps_num_dpb_params; i++ ) { | |
|     if( vps_max_sublayers_minus1 > 0 && !vps_all_layers_same_num_sublayers_flag ) | |
|       dpb_max_temporal_id[ i ] | u(3) |
|     dpb_parameters( dpb_max_temporal_id[ i ], vps_sublayer_dpb_params_present_flag ) | |
|   } | |
| ... | |
| } | |

3.1.2. Sequence Parameter Set (SPS)

The syntax table and semantics of multiple syntax elements in the latest VVC draft text (JVET-Q2001-vE/v15) are defined as follows:

7.3.2.3 Sequence Parameter Set RBSP Syntax

| | Descriptor |
|---|---|
| seq_parameter_set_rbsp( ) { | |
|   sps_seq_parameter_set_id | u(4) |
|   sps_video_parameter_set_id | u(4) |
| ... | |
|   sps_entropy_coding_sync_enabled_flag | u(1) |
|   if( sps_entropy_coding_sync_enabled_flag ) | |
|     sps_wpp_entry_point_offsets_present_flag | u(1) |
|   sps_weighted_pred_flag | u(1) |
|   sps_weighted_bipred_flag | u(1) |
|   log2_max_pic_order_cnt_lsb_minus4 | u(4) |
|   sps_poc_msb_flag | u(1) |
|   if( sps_poc_msb_flag ) | |
|     poc_msb_len_minus1 | ue(v) |
|   num_extra_ph_bits_bytes | u(2) |
|   extra_ph_bits_struct( num_extra_ph_bits_bytes ) | |
|   num_extra_sh_bits_bytes | u(2) |
|   extra_sh_bits_struct( num_extra_sh_bits_bytes ) | |
|   if( sps_max_sublayers_minus1 > 0 ) | |
|     sps_sublayer_dpb_params_flag | u(1) |

| | Descriptor |
|---|---|
| if( sps_ptl_dpb_hrd_params_present_flag ) | |
|     dpb_parameters( sps_max_sublayers_minus1, sps_sublayer_dpb_params_flag ) | |
|     long_term_ref_pics_flag | u(1) |
|     inter_layer_ref_pics_present_flag | u(1) |
|     sps_idr_rpl_present_flag | u(1) |
|     rpl1_same_as_rpl0_flag | u(1) |
|     for( i = 0; i < rpl1_same_as_rpl0_flag ? 1 : 2; i++ ) { | |
|       num_ref_pic_lists_in_sps[ i ] | ue(v) |
|       for( j = 0; j < num_ref_pic_lists_in_sps[ i ]; j++) | |
|         ref_pic_list_struct( i, j ) | |
|     } | |
| ... | |
|     sps_amvr_enabled_flag | u(1) |
|     sps_bdof_enabled_flag | u(1) |
|     if( sps_bdof_enabled_flag ) | |
|       sps_bdof_pic_present_flag | u(1) |
|     sps_smvd_enabled_flag | u(1) |
|     sps_dmvr_enabled_flag | u(1) |
|     if( sps_dmvr_enabled_flag) | |
|       sps_dmvr_pic_present_flag | u(1) |
|     sps_mmvd_enabled_flag | u(1) |
| ... | |
|     if( sps_transform_skip_enabled_flag \|\| sps_palette_enabled_flag ) | |
|       min_qp_prime_ts_minus4 | ue(v) |
|     sps_bcw_enabled_flag | u(1) |
|     sps_ibc_enabled_flag | u(1) |
|     if( sps_ibc_enabled_flag ) | |
|       six_minus_max_num_ibc_merge_cand | ue(v) |
|     sps_ciip_enabled_flag | u(1) |
|     if( sps_mmvd_enabled_flag ) | |
|       sps_fpel_mmvd_enabled_flag | u(1) |
|     if( MaxNumMergeCand >= 2 ) { | |
|       sps_gpm_enabled_flag | u(1) |
|       if( sps_gpm_enabled_flag && MaxNumMergeCand >= 3 ) | |
|         max_num_merge_cand_minus_max_num_gpm_cand | ue(v) |
|     } | |
| ... | |
| } | |

3.1.3. General Constraint Flag 7.3.3.2 General Constraint Information Syntax

| | Descriptor |
|---|---|
| general_constraint_info( ) { | |
| ... | |
|     general_non_projected_constraint_flag | u(1) |
|     intra_only_constraint_flag | u(1) |
|     max_bitdepth_constraint_idc | u(4) |
|     max_chroma_format_constraint_idc | u(2) |
|     no_res_change_in_clvs_constraint_flag | u(1) |
|     one_tile_per_pic_constraint_flag | u(1) |
|     one_slice_per_pic_constraint_flag | u(1) |
|     one_subpic_per_pic_constraint_flag | u(1) |
|     no_qtbtt_dual_tree_intra_constraint_flag | u(1) |
|     no_partition_constraints_override_constraint_flag | u(1) |
|     no_sao_constraint_flag | u(1) |
|     no_alf_constraint_flag | u(1) |
|     no_ccalf_constraint_flag | u(1) |
|     no_joint_cbcr_constraint_flag | u(1) |
|     no_ref_wraparound_constraint_flag | u(1) |
|     no_temporal_mvp_constraint_flag | u(1) |
|     no_sbtmvp_constraint_flag | u(1) |
|     no_amvr_constraint_flag | u(1) |
|     no_bdof_constraint_flag | u(1) |
|     no_dmvr_constraint_flag | u(1) |
|     no_cclm_constraint_flag | u(1) |
|     no_mts_constraint_flag | u(1) |
|     no_sbt_constraint_flag | u(1) |
|     no_affine_motion_constraint_flag | u(1) |
|     no_bcw_constraint_flag | u(1) |
|     no_ibc_constraint_flag | u(1) |
|     no_ciip_constraint_flag | u(1) |
|     no_fpel_mmvd_constraint_flag | u(1) |
|     no_gpm_constraint_flag | u(1) |
| ... | |
| } | | no_bdof_constraint_flag equal to 1 specifies that sps_bdof_enabled_flag shall be equal to 0. no_bdof_constraint_flag equal to 0 does not impose such a constraint.

no_dmmvr_constraint_flag equal to 1 specifies that sps_dmvr_enabled_flag shall be equal to 0. no_dmvr_constraintflag equal to 0 does not impose such a constraint.

no_bcw_constraint_flag equal to 1 specifies that sps_bcw_enabled_flag shall be equal to 0. no_bcw_constraint_flag equal to 0 does not impose such a constraint.

no_cipp_constraint_flag equal to 1 specifies that sps_ciip_enabled_flag shall be equal to 0. no_cipp_constraint_flag equal to 0 does not impose such a constraint.

no_gpm_constraint_flag equal to 1 specifies that sps_gpm_enabled_flag shall be equal to 0. no_gpm_constraint_flag equal to 0 does not impose such a constraint.

3.1.4. Picture Parameter Set (PPS)

The syntax table and semantics of multiple syntax elements in the latest VVC draft text (JVET-Q2001-vE/v15) are defined as follows:

7.3.2.4 Picture Parameter Set RBSP Syntax

| | Descriptor |
|---|---|
| pic_parameter_set_rbsp( ) { | |
|     pps_pic_parameter_set_id | ue(v) |
|     pps_seq_parameter_set_id | u(4) |
|     mixed_nalu_types_in_pic_flag | u(1) |
| ... | |
|     cabac_init_present_flag | u(1) |
|     for( i = 0; i < 2; i++ ) | |
|       num_ref_idx_default_active_minus1[ i ] | ue(v) |
| ... | |
|     pps_weighted_pred_flag | u(1) |
|     pps_weighted_bipred_flag | u(1) |
|     deblocking_filter_control_present_flag | u(1) |
| ... | |
| } | | num_ref_idx_default_active_minus1[i] plus 1, when i is equal to 0, specifies the inferred value of the variable NumRefIdxActive[0] for P or B slices with num_ref_idx_active_override_flag equal to 0, and, when i is equal to 1, specifies the inferred value of NumRefIdxActive[1] for B slices with num_ref_idx_active_override_flag equal to 0. The value of num_ref_idx_default_active_minus1[i] shall be in the range of 0 to 14, inclusive. pps_weighted_bipred_flag equal to 0 specifies that explicit weighted prediction is not applied to B slices referring to the PPS. pps_weighted_bipred_flag equal to 1 specifies that explicit weighted prediction is applied to B slices referring to the PPS. When sps_weighted_bipred_flag is equal to 0, the value of pps_weighted_bipred_flag shall be equal to 0.

3.1.5. DPB Parameters Syntax

The syntax table and semantics of multiple syntax elements in the latest VVC draft text (JVET-Q2001-vE/v15) are defined as follows:

7.3.4 DPB Parameters Syntax

| | Descriptor |
|---|---|
| dpb_parameters( maxSubLayersMinus1, subLayerInfoFlag ) { | |
|   for( i = ( subLayerInfoFlag ? 0 : maxSubLayersMinus1 ); | |
|     i <= maxSubLayersMinus1; i++ ) { | |
|     max_dec_pic_buffering_minus1[ i ] | ue(v) |
|     max_num_reorder_pics[ i ] | ue(v) |
|     max_latency_increase_plus1[ i ] | ue(v) |
|   } | |
| } | |

7.4.5 DPB Parameters Semantics

The dpb_parameters( ) syntax structure provides information of DPB size, maximum picture reorder number, and maximum latency for one or more OLSs.

When a dpb_parameters( ) syntax structure is included in a VPS, the OLSs to which the dpb_parameters( ) syntax structure applies are specified by the VPS. When a dpb_parameters( ) syntax structure is included in an SPS, it applies to the OLS that includes only the layer that is the lowest layer among the layers that refer to the SPS, and this lowest layer is an independent layer.

max_dec_pic_buffering_minus1[i] plus 1 specifies the maximum required size of the DPB in units of picture storage buffers when Htid is equal to i. The value of max_decpic_buffering_minus1[i] shall be in the range of 0 to MaxDpbSize−1, inclusive, where MaxDpbSize is as specified in clause A.4.2. When i is greater than 0, max_dec_pic_buffering_minus1[i] shall be greater than or equal to max_decpic_buffering_minus1[i−1]. When max_dec_pic_buffering_minus1[i] is not present for i in the range of 0 to maxSubLayersMinus1−1, inclusive, due to subLayerInfoFlag being equal to 0, it is inferred to be equal to max_dec_pic_buffering_minus1 [maxSubLayersMinus1].

max_num_reorder_pics[i] specifies the maximum allowed number of pictures of the OLS that can precede any picture in the OLS in decoding order and follow that picture in output order when Htid is equal to i. The value of max_num_reorder_pics[i] shall be in the range of 0 to max_dec_pic_buffering_minus1[i], inclusive. When i is greater than 0, max_num_reorder_pics[i] shall be greater than or equal to max_num_reorder_pics[i−1]. When max_num_reorder_pics[i] is not present for i in the range of 0 to maxSubLayersMinus1−1, inclusive, due to subLayerInfoFlag being equal to 0, it is inferred to be equal to max_num_reorder_pics[maxSubLayersMinus1]. max_latency_increase_plus1[i] not equal to 0 is used to compute the value of MaxLatencyPictures[i], which specifies the maximum number of pictures in the OLS that can precede any picture in the OLS in output order and follow that picture in decoding order when Htid is equal to i.

When max_latency_increase_plus1[i] is not equal to 0, the value of MaxLatencyPictures[i] is specified as follows:

$$MaxLatencyPictures[i] = max\_num\_reorder\_pics[i] + max\_latency\_increase\_plus1[i] - 1 \quad (7\text{-}110)$$

When max_latency_increase_plus1[i] is equal to 0, no corresponding limit is expressed.

The value of max_latency_increase_plus1[i] shall be in the range of 0 to $2^{32}-2$, inclusive. When max_latency_increase_plus1[i] is not present for i in the range of 0 to maxSubLayersMinus1−1, inclusive, due to subLayerInfoFlag being equal to 0, it is inferred to be equal to max_latency_increase_plus1[maxSubLayersMinus1].

3.2. Picture Header (PH) and Slice Header (SH) in VVC

Similarly as in HEVC, the slice header in VVC conveys information for a particular slice. This includes slice address, slice type, slice QP, picture order count (POC) least significant bits (LSBs), RPS and RPL information, weighted prediction parameters, loop filtering parameters, entry offsets of tiles and WPP, etc.

VVC introduced the picture header (PH), which contains header parameters for a particular picture. Each picture must have one or only one PH. The PH basically carries those parameters that would have been in the slice header if PH were not introduced but each has the same value for all slices of a picture. These include IRAP/GDR picture indications, inter/intra slices allowed flags, POC LSB and optionally POC MSB, information on RPLs, deblocking, SAO, ALF, QP delta, and weighted prediction, coding block partitioning information, virtual boundaries, co-located picture information, etc. It often occurs that each picture in an entire sequence of pictures contains only one slice. To allow not to have at least two NAL units for each picture in such cases, the PH syntax structure is allowed to be included either the PH NAL unit or in the slice header.

In VVC, information on the collocated picture, which is used for temporal motion vector prediction, is signalled either in the picture header or the slice header.

3.2.1. Picture Header (PH)

The syntax table and semantics of multiple syntax elements in the latest VVC working draft Q) are defined as follows:

7.3.2.7 Picture Header Structure Syntax

| | Descriptor |
|---|---|
| picture_header_structure( ) { | |
|   gdr_or_irap_pic_flag | u(1) |
|   if( gdr_or_irap_pic_flag ) | |
|     gdr_pic_flag | u(1) |
|   ph_inter_slice_allowed_flag | u(1) |
|   if( ph_inter_slice_allowed_flag ) | |
|     ph_intra_slice_allowed_flag | u(1) |
|   non_reference_picture_flag | u(1) |
|   ... | |
|   if( sps_temporal_mvp_enabled_flag ) { | |
|     ph_temporal_mvp_enabled_flag | u(1) |
|     if( ph_temporal_mvp_enabled_flag && | |
| rpl_info_in_ph_flag ) { | |
|       ph_collocated_from_l0_flag | u(1) |
|       if( ( ph_collocated_from_l0_flag && | |
|         num_ref_entries[ 0 ][ RplsIdx[ 0 ] ] > 1 ) \|\| | |
|       ( !ph_collocated_from_l0_flag && | |
|         num_ref_entries[ 1 ][ RplsIdx[ 1 ] ] > 1 ) ) | |
|       ph_collocated_ref_idx | ue(v) |
|     } | |
|   } | |
|   ... | |
|   mvd_l1_zero_flag | u(1) |
|   if( sps_fpel_mmvd_enabled_flag ) | |
|     ph_fpel_mmvd_enabled_flag | u(1) |
|   if( sps_bdof_pic_present_flag ) | |
|     ph_disable_bdof_flag | u(1) |
|   if( sps_dmvr_pic_present_flag ) | |
|     ph_disable_dmvr_flag | u(1) |
|   if( sps_prof_pic_present_flag ) | |
|     ph_disable_prof_flag | u(1) |
|   if( ( pps_weighted_pred_flag \|\| | |
| pps_weighted_bipred_flag ) && wp_info_in_ph_flag ) | |
|     pred_weight_table( ) | |
|   } | |
| ... | |

3.2.2. Slice Header (SH)

The syntax table and semantics of multiple syntax elements in the latest WVC working draft( ) are defined as follows:

7.3.7.1 General Slice Header Syntax

| | Descriptor |
|---|---|
| slice_header( ) { | |
|   picture_header_in_slice_header_flag | u(1) |
|   if( picture_header_in_slice_header_flag ) | |
|     picture_header_structure( ) | |
|   if( subpic_info_present_flag ) | |
|     slice_subpic_id | u(v) |
|   if( ( rect_slice_flag && NumSlicesInSubpic[ CurrSubpicIdx ] > 1 ) \|\| | |
|     ( !rect_slice_flag && NumTilesInPic > 1 ) ) | |
|     slice_address | u(v) |
|   for( i = 0; i < NumExtraShBits; i++ ) | |
|     sh_extra_bit[ i ] | u(1) |
|   if( !rect_slice_flag && NumTilesInPic > 1 ) | |
|     num_tiles_in_slice_minus1 | ue(v) |
|   if( ph_inter_slice_allowed_flag ) | |
|     slice_type | ue(v) |
|   if( sps_alf_enabled_flag && !alf_info_in_ph_flag ) { | |
|     slice_alf_enabled_flag | u(1) |
|     if( slice_alf_enabled_flag ) { | |
|       slice_num_alf_aps_ids_luma | u(3) |
|       for( i = 0; i < slice_num_alf_aps_ids_luma; i++ ) | |
|         slice_alf_aps_id_luma[ i ] | u(3) |
|       if( ChromaArrayType != 0 ) | |
|         slice_alf_chroma_idc | u(2) |
|       if( slice_alf_chroma_idc ) | |
|         slice_alf_aps_id_chroma | u(3) |
|       if( sps_ccalf_enabled_flag ) { | |
|         slice_cc_alf_cb_enabled_flag | u(1) |
|         if( slice_cc_alf_cb_enabled_flag ) | |
|           slice_cc_alf_cb_aps_id | u(3) |
|         slice_cc_alf_cr_enabled_flag | u(1) |
|         if( slice_cc_alf_cr_enabled_flag ) | |
|           slice_cc_alf_cr_aps_id | u(3) |
|       } | |
|     } | |
|   } | |
|   if( separate_colour_plane_flag == 1 ) | |
|     colour_plane_id | u(2) |
|   if( !rpl_info_in_ph_flag && ( ( nal_unit_type != IDR_W_RADL && nal_unit_type != | |
|     IDR_N_LP ) \|\| sps_idr_rpl_present_flag ) ) | |
|     ref_pic_lists( ) | |
|   if( ( rpl_info_in_ph_flag \|\| ( ( nal_unit_type != IDR_W_RADL && nal_unit_type != | |
|     IDR_N_LP ) \|\| sps_idr_rpl_present_flag ) ) && | |
|     ( ( slice_type != I && num_ref_entries[ 0 ][ RplsIdx[ 0 ] ] > 1 ) \|\| | |
|       ( slice_type == B && num_ref_entries[ 1 ][ RplsIdx[ 1 ] ] > 1 ) ) ) { | |
|     num_ref_idx_active_override_flag | u(1) |
|     if( num_ref_idx_active_override_flag ) | |
|       for( i = 0; i < ( slice_type == B ? 2: 1 ); i++ ) | |
|         if( num_ref_entries[ i ][ RplsIdx[ i ] ] > 1 ) | |
|           num_ref_idx_active_minus1[ i ] | ue(v) |
|   } | |
|   if( slice_type != I ) { | |
|     if( cabac_init_present_flag ) | |
|       cabac_init_flag | u(1) |
|     if( ph_temporal_mvp_enabled_flag && !rpl_info_in_ph_flag ) { | |
|       if( slice_type == B ) | |
|         slice_collocated_from_l0_flag | u(1) |
|       if( ( slice_collocated_from_l0_flag && NumRefIdxActive[ 0 ] > 1 ) \|\| | |
|         ( !slice_collocated_from_l0_flag && NumRefIdxActive[ 1 ] > 1 ) ) | |
|         slice_collocated_ref_idx | ue(v) |
|     } | |
|     if( !wp_info_in_ph_flag && ( ( pps_weighted_pred_flag && slice_type == P ) \|\| | |
|       ( pps_weighted_bipred_flag && slice_type == B ) ) ) | |
|       pred_weight_table( ) | |
|   } | |
|   if( !qp_delta_info_in_ph_flag ) | |
|     slice_qp_delta | se(v) |
|   if( pps_slice_chroma_qp_offsets_present_flag ) { | |
|     slice_cb_qp_offset | se(v) |
|     slice_cr_qp_offset | se(v) |
|     if( sps_joint_cbcr_enabled_flag ) | |
|       slice_joint_cbcr_qp_offset | se(v) |
|   } | |
|   if( pps_cu_chroma_qp_offset_list_enabled_flag ) | |
|     cu_chroma_qp_offset_enabled_flag | u(1) |
|   if( sps_sao_enabled_flag && !sao_info_in_ph_flag ) { | |
|     slice_sao_luma_flag | u(1) |
|     if( ChromaArrayType != 0 ) | |
|       slice_sao_chroma_flag | u(1) |
|   } | |
| ... | |
| } | | slice_type specifies the coding type of the slice according to Table 9.

TABLE 9

Name association to slice_type

| slice_type | Name of slice_type |
|---|---|
| 0 | B (B slice) |
| 1 | P (P slice) |
| 2 | I (I slice) |

When not present, the value of slice_type is inferred to be equal to 2.

When ph_intra_slice_allowed_flag is equal to 0, the value of slice_type shall be equal to 0 or 1. When nal_unit_type is in the range of IDR_W_RADL to CRA_NUT, inclusive, and vps_independent_layer_flag[GeneralLayerIdx[nuh_layer_id]] is equal to 1, slice_type shall be equal to 2.

3.3. Recent Progress in JVET-R0052

In JVET-R0052 method #2, it is proposed to add one allowed type index (i.e., ph_allowed_slice_types_ide), and whether B slices are used in a picture could be derived from the newly added syntax element.

| ph_allowed_slice_types_idc | allowed values of slice types |
|---|---|
| 0 | 1, 2 (P, I) |
| 1 | 0, 2 (B, I) |
| 2 | 0, 1 (B, P) |
| 3 | 0, 1, 2 (B, P, I) |

In addition, another new syntax element ph_multiple_slice_types_in_pic_flag is added to the PH structure for specifying whether more than one slice types may be present in the current picture. ph_multiple_slice_types_in_pic_flag equal to 1 specifies that coded slices of the picture may have different values of slice_type. ph_multiple_slice_types_in_ pic_flag equal to 0 specifies that all coded slices of the picture have the same value of slice_type. When ph_multiple_slice_types_in_pic_flag is equal to 0, ph_slice_type is further signalled to specify the value of slice_type for all slices of the picture and slice_type in the slice header is not coded and is inferred to be equal to the value of ph_slice_type.

7.3.2.7 Picture Header Structure Syntax

|  | Descriptor |
|---|---|
| picture_header_structure( ) { |  |
|   gdr_or_irap_pic_flag | u(1) |
|   if( gdr_or_irap_pic_flag ) |  |
|     gdr_pic_flag | u(1) |
|   if ( !no_pic partition_flag  && |  |
|     ! ( rect_slice_flag  &&  num_slices_in_pic_minus1  == 0 ) ) |  |
|     [[ph_multiple_slice_types_in_pic_flag]] ph_multiple_slice_types_in_pic_flag | u(1) |
|   if( [[ph_multiple_slice_types_in_pic_flag]] ph_multiple_slice_types_in_pic_flag) |  |
|     [[ph_intra_slice_allowed_flag]] ph_allowed_slice_types_idc | u(2) |
|   else |  |
|     ph_slice_type | ue(v) |
|   non_reference_picture_flag | u(1) |
|   ph_pic_parameter_set_id | ue(v) |
|   ..... |  |
|   if( partition_constraints_override_enabled_flag ) |  |
|     partition_constraints_override_flag | u(1) |
|   if( [[ph_intra_slice_allows_flag]] ISliceAllowed ) { |  |
|     if( partition_constraints_override_flag ) { |  |
|       ph_log2_diff_min_qt_min_cb_intra_slice_luma | ue(v) |
|       ph_max_mtt_hierarchy_depth_intra_slice_luma | ue(v) |
|       if( ph_max_mtt_hierarchy_depth_intra_slice_luma  != 0 ) { |  |
|         ph_log2_diff_max_bt_min_qt_intra_slice_luma | ue(v) |
|         ph_log2_diff_max_tt_min_qt_intra_slice_luma | ue(v) |
|       } |  |
|       if( qtbtt_dual_tree_intra_flag ) { |  |
|         ph_log2_diff_min_qt_min_cb_intra_slice_chroma | ue(v) |
|         ph_max_mtt_hierarchy_depth_intra_slice_chroma | ue(v) |
|         if( ph_max_mtt_hierarchy_depth_intra_slice_chroma != 0 ) { |  |
|           ph_log2_diff_max_bt_min_qt_intra_slice_chroma | ue(v) |
|           ph_log2_diff_max_tt_min_qt_intra_slice_chroma | ue(v) |
|         } |  |
|       } |  |
|     } |  |
|     if( cu_qp_delta_enabled_flag ) |  |
|       ph_cu_qp_delta_subdiv_intra_slice | ue(v) |
|     if( pps_cu_chroma_qp_offset_list_enabled_flag ) |  |
|       ph_cu_chroma_qp_offset_subdiv_intra_slice | ue(v) |
|   } |  |
|   if( [[ph_intra_slice_allows_flag]] BSliceAllowed  ||  PSliceAllowed ) { |  |
|     if( partition_constraints_override_flag ) { |  |
|       ph_log2_diff_min_qt_min_cb_inter_slice | ue(v) |
|       ph_max_mtt_hierarchy_depth_inter_slice | ue(v) |
|       if( ph_max_mtt_hierarchy_depth_inter_slice != 0 ) { |  |
|         ph_log2_diff_max_bt_min_qt_inter_slice | ue(v) |
|         ph_log2_diff_max_tt_min_qt_inter_slice | ue(v) |
|       } |  |
|     } |  |
|     if( cu_qp_delta_enabled_flag ) |  |
|       ph_cu_qp_delta_subdiv_inter_slice | ue(v) |
|     if( pps_cu_chroma_qp_offset_list_enabled_flag ) |  |
|       ph_cu_chroma_qp_offset_subdiv_inter_slice | ue(v) |
|     if( sps_temporal_mvp_enabled_flag ) { |  |
|       ph_temporal_mvp_enabled_flag | u(1) |
|       if( ph_temporal_mvp_enabled_flag && rpl_info_in_ph_flag ) { |  |
|         if( BSliceAllowed  ) |  |
|           ph_collocated_from_l0_flag | u(1) |
|         if( ( ph_collocated_from_l0_flag && |  |
|           num_ref_entries[ 0 ][ RplsIdx[ 0 ] ] > 1 ) |  |
|   ||  |  |
|           ( !ph_collocated_from_l0_flag && |  |
|           num_ref_entries[ 1 ][ RplsIdx[ 1 ] ] > 1 )) |  |
|           ph_collocated_ref_idx | ue(v) |
|       } |  |
|     } |  |

-continued

| | Descriptor |
|---|---|
|     if( BSliceAllowed ) | |
|         mvd_l1_zero_flag | u(1) |
|   if( sps_fpel_mmvd_enabled_flag ) | |
|         ph_fpel_mmvd_enabled_flag | u(1) |
|   if( sps_bdof_pic_present_flag && BSliceAllowed ) | |
|         ph_disable_bdof_flag | u(1) |
|   if( sps_dmvr_pic_present_flag && BSliceAllowed ) | |
|         ph_disable_dmvr_flag | u(1) |
|   if( sps_prof_pic_present_flag ) | |
|         ph_disable_prof_flag | u(1) |
|   if( (( pps_weighted_pred_flag && PSliceAllowed ) \|\| ( pps_weighted_bipred_flag && BSliceAllowed )) && wp_info_in_ph_flag ) | |
|         pred_weight_table( ) | |
|   } | |
|   ..... | |
| } | |

7.3.7.1 General Slice Header Syntax

| | Descriptor |
|---|---|
| slice_header( ) { | |
|   picture_header_in_slice_header_flag | u(1) |
|   if( picture_header_in_slice_header_flag ) | |
|     picture_header_structure( ) | |
|   if( subpic_info_present_flag ) | |
|     slice_subpic_id | u(v) |
|   if( ( rect_slice_flag && NumSlicesInSubpic[ CurrSubpicIdx ] > 1 ) \|\| | |
|     ( !rect_slice_flag && NumTilesInPic > 1 ) ) | |
|     slice_address | u(v) |
|   for( i = 0; i < NumExtraShBits; i++ ) | |
|     sh_extra_bit[ i ] | u(1) |
|   if( !rect_slice_flag && NumTilesInPic > 1 ) | |
|     num_tiles_in_slice_minus1 | ue(v) |
|   if( [[ph_inter_slice_allowed_flag]] ph_multiple_slice types in_pic_flag ) | |
|     if ( ph_allowed_slice_types_idc = = 3 ) | |
|       slice_type | ue(v) |
|     else | |
|       slice_type_modified | u(1) |
|   ..... | |
| } | |

| 7.3.7.2 Weighted prediction parameters syntax | |
|---|---|
| pred_weight_table( ) { | |
|   luma_log2_weight_denom | ue(v) |
|   if( ChromaArrayType != 0 ) | |
|     delta_chroma_log2_weight_denom | se(v) |
|   if( wp_info_in_ph_flag ) | |
|     num_l0_weights | ue(v) |
|   for( i = 0; i < NumWeightsL0; i++ ) | |
|     luma_weight_l0_flag[ i ] | u(1) |
|   if( ChromaArrayType != 0 ) | |
|     for( i = 0; i < NumWeightsL0; i++ ) | |
|       chroma_weight_l0_flag[ i ] | u(1) |
|   for( i = 0; i < NumWeightsL0; i++ ) { | |
|     if( luma_weight_l0_flag[ i ] ) { | |
|       delta_luma_weight_l0[ i ] | se(v) |
|       luma_offset_l0[ i ] | se(v) |
|     } | |
|     if( chroma_weight_l0_flag[ i ] ) | |
|       for( j = 0; j < 2; j++ ) { | |
|         delta_chroma_weight_l0[ i ][ j ] | se(v) |
|         delta chroma_offset_l0[ i ][ j ] | se(v) |
|       } | |
|   } | |
|   if( pps_weighted_bipred_flag && ( wp_info_in_ph_flag && BSliceAllowed ) ) | |
|     num_l1_weights | ue(v) |
|   for( i = 0; i < NumWeightsL1; i++ ) | |
|     luma_weight_l1_flag[ i ] | u(1) |

-continued

```
if( ChromaArrayType != 0 )
   for( i = 0; i < NumWeightsL1; i++ )
      chroma_weight_l1_flag[ i ]                              u(1)
for( i = 0; i < NumWeightsL1; i++ ) {
   if( luma_weight_l1_flag[ i ] ) {
      delta_luma_weight_l1[ i ]                               se(v)
      luma_offset_l1[ i ]                                     se(v)
   }
   if( chroma_weight_l1_flag[ i ] )
      for( j = 0; j < 2; j++ ) {
         delta_chroma_weight_l1[ i ][ j ]                     se(v)
         delta_chroma_offset_l1[ i ][ j ]                     se(v)
      }
   }
}
```

7.4.3.7 Picture Header Structure Semantics ph_multiple_slice_types_in_pic_flag equal to 1 specifies that coded slices of the picture may have different values of slice_type.

ph_multiple_slice_types_in_pic_flag equal to 0 specifies that all coded slices of the picture have the same value of slice_type. When ph_multiple_slice_types_in_pic_flag is not present, it is inferred to be equal to 0.

ph_allowed_slice_types_idc specifies the allowed values of slice_type for coded slices in the picture according to Table X when ph_multiple_slice_types_in_pic_flag is equal to 1.

TABLE X

The allowed values of slice_type specified by ph_allowed_slice_types_idc

| ph_allowed_slice_types_idc | allowed values of slice types |
|---|---|
| 0 | 1, 2 (P, I) |
| 1 | 0, 2 (B, I) |
| 2 | 0, 1 (B, P) |
| 3 | 0, 1, 2 (B, P, I) | ph_slice_type specifies the value of slice_type for all slice headers in the picture when ph_muliple_slice_types_in_pic_flag is equal to 0.

The variables BSliceAllowed, PSliceAllowed and ISliceAllowed are derived as follows:
   If ph_multiple_slice_types_in_pic_flag is equal to 0, BSliceAllowed is set equal to (ph_slice_type==B), PSliceAllowed is set equal to (ph_slice_type==P), and ISliceAllowed is set equal to (ph_slice_type==I).
   Otherwise, BSliceAllowed is set equal to (ph_allowed_slice_types_idc !=0), PSliceAllowed is set equal to (ph_allowed_slice_types_idc !=1), and ISliceAllowed is set equal to (ph_allowed_slice_types_idc !=2)

[[ph_inter_slice_allowed_flag equal to 0 specifies that all coded slices of the picture have slice_type equal to 2.
ph_inter_slice_allowed_flag equal to 1 specifies that there may or may not be one or more coded slices in the picture that have slice_type equal to 0 or 1.
ph_intra_slice_allowed_flag equal to 0 specifies that all coded slices of the picture have slice_type equal to 0 or 1.
ph_intra_slice_allowed_flag equal to 1 specifies that there may or may not be one or more coded slices in the picture that have slice_type equal to 2. When not present, the value of ph_intra_slice_allowed_flag is inferred to be equal to 1.]]

NOTE 2—For bitstreams that are suppposed to work subpicure based bitstream merging without the need of changing PH NAL units, the encoder is expected to set the values of [[both ph_inter_slice_allowed_flag and ph_intra_slice_allowed_flag]] BSliceAllowed, PSliceAllowed, and ISliceAllowed equal to 1.

7.4.8.1 General Slice Header Semantics slice_type specifies the coding type of the slice according to Table 9.

TABLE 9

Name association to slice_type

| slice_type | Name of slice_type |
|---|---|
| 0 | B (B slice) |
| 1 | P (P slice) |
| 2 | I (I slice) |

When not present, the value of slice_types is [[inferred to be equal to 2]] derived as follows:
   If ph_multiple_slice_types_in_pic_flag is equal to 1, the value of slice_type is set equal to (slice_type_modified>=ph_allowed_slice_types_idc ? slice_type_modified+1 slice_type_modified).
   Otherwise, the value of slice_type is set equal to the value of ph_slice_type.

slice_type_modified is used for deriving the value of slice_type when ph_multiple_slice_types_in_pic_flag is equal to 1 and the value of ph_allowed_slice_types_idc is not equal to 3.

[[When ph_intra_slice_allowed_flag is equal to 0, the value of slice_type shall be equal to 0 or 1.]] When nal_unit_type is in the range of IDR_W_RADL to CRA_NUT, inclusive, and vps_independent_layer_flag[GeneralLayerIdx [nuh_layer_id]] is equal to 1, slice_type shall be equal to 2.

7.4.8.2 Weighted Prediction Parameters Semantics num_l1_weights specifies the number of weights signalled for entries in reference picture list 1 when pps_weighted_bipred_flag and wp_info_in_ph_flag are both equal to 1. The value of num_l1_weights shall be in the range of 0 to Min(15, num_ref_entries[1][RplsIdx[1]]), inclusive.

The variable NumWeightsL1 is derived as follows:

```
if( !pps_weighted_bipred_flag )
   NumWeightsL1 = 0
else if( wp_info_in_ph_flag )                                 (148)
   NumWeightsL1 = BSliceAllowed ? num_l1_weights : 0
else
   NumWeightsL1 = NumRefIdxActive[ 1 ]
```

A new syntax element pps_multiple_slice_types_in_ic_flag can be further signalled in the PPS. When pps_multiple_slice_types_inpic_flag is equal to 0, ph_multiple_slice_types_in_pic_flag is inferred to be equal to 0 for all PHs referring to the PPS.

The related modifications to C Draft 8 are provided below:

7.3.2.4 Picture Parameter Set RBSP Syntax

|  | Descriptor |
|---|---|
| pic_parameter_set_rbsp( ) { |  |
|     pps_pic_parameter_set_id | ue(v) |
|     pps_seq_parameter_set_id | u(4) |
|     ... |  |
|     no_pic_partition_flag | u(1) |
|     if( !no_pic_partition_flag ) { |  |
| ... |  |
|   if ( ! (rect_slice_flag && num_slices_in_pic_minus1 = = 0) ) |  |
|     pps_multiple_slice_types_in_pic_flag | u(1) |
|     loop_filter_across_tiles_enabled_flag | u(1) |
|     loop_filter_across_slices_enabled_flag | u(1) |
|   } |  |
|   ... |  |
| } |  |

PH of Method 1
7.3.2.7 Picture Header Structure Syntax

|  | Descriptor |
|---|---|
| picture_header_structure( ) { |  |
|   gdr_or_irap_pic_flag | u(1) |
|   if( gdr_or_irap_pic_flag ) |  |
|     gdr_pic_flag | u(1) |
|   if ( !no_pic_partition_flag && pps_multiple_slice_types_in_pic_flag && ! ( rect_slice_flag && num_slices_in_pic_minus1 = = 0 ) ) |  |
|     [[ph_inter_slice_allowed_flag]] ph_multiple_slice_types_in_pic_flag | u(1) |
|     if( [[ph_inter_slice_allowed_flag]] ph_multiple_slice_types_in_pic_flag ) |  |
|       ph_intra_slice_allowed_flag | u(1) |
|     else |  |
|       ph_slice_type | ue(v) |
|   non_reference_picture_flag | u(1) |
|   ph_pic_parameter_set_id | ue(v) |
|   ..... |  |
| } |  |

PH of Method 2

|  | Descriptor |
|---|---|
| picture_header_structure( ) { |  |
|   gdr_or_irap_pic_flag | u(1) |
|   if( gdr_or_irap_pic_flag ) |  |
|     gdr_pic_flag | u(1) |
|   if ( !no_pic_partition_flag && pps_multiple_slice_types_in_pic_flag && ! ( rect_slice_flag && num_slices_in_pic_minus1 = = 0 ) ) |  |
|     [[ph_inter_slice_allowed_flag]] ph_multiple_slice_types_in_pic_flag | u(1) |
|     if( [[ph_inter_slice_allowed_flag]] ph_multiple_slice_types_in_pic_flag ) |  |
|       [[ph_inter_slice_allowed_flag]] ph_allowed_slice_types_idc | u(2) |
|     else |  |
|       ph_slice_type | ue(v) |
|   non_reference_picture_flag | u(1) |
|   ph_pic_parameter_set_id | ue(v) |
|   ..... |  |
| } |  |

7.4.3.4 Picture Parameter Set RBSP Semantics pps_multiple_slice_types_in_pic_flag equal to 1 specifies that coded slices of the picture may have different values of slice_type for all pictures referring to the PPS. pps_multiple_slice_types_in_pic_flag equal to 0 specifies that all coded slices of the picture have the same value of slice_type for all pictures referring to the PPS. When pps_multiple_slice_types_in_pic_flag is not present, the value of pps_multiple_slice_types_in_pic_flag is inferred to be equal to 0.

3.4. Uncoded Subpictures and Potential Applications in JVET-R0151

In this disclosure it is shown how VVC can be extended with a mechanism that enables uncoded subpictures. Uncoded subpictures can be used for efficient coding when subpictures do not completely fill up a picture, by providing completely unused regions. Examples are shown for OMAF use cases, as well as for three hundred sixty degree (360°) video coding of 4×3 cubemaps. Further, uncoded subpictures can be used to reserve space which is filled not with coded data, but with content generated from already coded content. Here, the example of high-level, efficient geometry padding for 360' video is shown.

3.5. APS 7.3.2.5 Adaptation Parameter Set RBSP Syntax

|  | Descriptor |
|---|---|
| adaptation_parameter_set_rbsp( ) { |  |
|   adaptation_parameter_set_id | u(5) |
|   aps_params_type | u(3) |
|   if( aps_params_type = = ALF_APS ) |  |
|     alf_data( ) |  |
|   else if( aps_params_type = = LMCS_APS ) |  |
|     lmcs_data( ) |  |
|   else if( aps_params_type = = SCALING_APS ) |  |
|     scaling_list_data( ) |  |
|   aps_extension_flag | u(1) |
|   if( aps_extension_flag ) |  |
|     while( more_rbsp_data( ) ) |  |
|       aps_extension_data_flag | u(1) |
|   rbsp_trailing_bits( ) |  |
| } |  |

Syntax Tables for ALF APS Data:
7.3.2.19 Adaptive Loop Filter Data Syntax

|  | Descriptor |
|---|---|
| alf_data( ) { |  |
|    alf_luma_filter_signal_flag | u(1) |
|    alf_chroma_filter_signal_flag | u(1) |
|    alf_cc_cb_filter_signal_flag | u(1) |
|    alf_cc_cr_filter_signal_flag | u(1) |
|    if( alf_luma_filter_signal_flag ) { |  |
|    alf_luma_clip_flag | u(1) |
|    alf_luma_num_filters_signalled_minus1 | ue(v) |
|    if( alf_luma_num_filters_signalled_minus1 > 0 ) |  |
|      for( filtIdx = 0; filtIdx < NumAlfFilters; filtIdx++ ) |  |
|        alf_luma_coeff_delta_idx[ filtIdx ] | u(v) |
|    for( sfIdx = 0; sfIdx <= alf_luma_num_filters_signalled_minus1; sfIdx++ ) |  |
|      for( j = 0; j < 12; j++ ) { |  |
|        alf_luma_coeff_abs[ sfIdx ][ j ] | ue(v) |
|        if( alf_luma_coeff_abs[ sfIdx ][ j ] ) |  |
|          alf_luma_coeff_sign[ sfIdx ][ j ] | u(1) |
|      } |  |
|    if( alf_luma_clip_flag ) |  |
|      for( sfIdx = 0; sfIdx <= alf_luma_num_filters_signalled_minus1; sfIdx++ ) |  |
|        for( j = 0; j < 12; j++ ) |  |
|          alf_luma_clip_idx[ sfIdx ][ j ] | u(2) |
|  } |  |
|    if( alf_chroma_filter_signal_flag ) { |  |
|    alf_chroma_clip_flag | u(1) |
|    alf_chroma_num_alt_filters_minus1 | ue(v) |
|    for( altIdx = 0; altIdx <= alf_chroma_num_alt_filters_minus1; altIdx++ ) { |  |
|      for( j = 0; j < 6; j++ ) { |  |
|        alf_chroma_coeff_abs[ altIdx ][ j ] | ue(v) |
|        if( alf_chroma_coeff_abs[ altIdx ][ j ] > 0 ) |  |
|          alf_chroma_coeff_sign[ altIdx ][ j ] | u(1) |
|      } |  |
|      if( alf_chroma_clip_flag ) |  |
|        for(j = 0; j < 6; j++ ) |  |
|          alf_chroma_clip_idx[ altIdx ][ j ] | u(2) |
|    } |  |
|  } |  |
|    if( alf_cc_cb_filter_signal_flag ) { |  |
|    alf_cc_cb_filters_signalled_minus1 | ue(v) |
|    for( k = 0; k < alf_cc_cb_filters_signalled_minus1 + 1; k++ ) { |  |
|      for( j = 0; j < 7; j++ ) { |  |
|        alf_cc_cb_mapped_coeff_abs[ k ][ j ] | u(3) |
|        if( alf_cc_cb_mapped_coeff_abs[ k ][ j ] ) |  |
|          alf_cc_cb_coeff_sign[ k ][ j ] | u(1) |
|      } |  |
|    } |  |
|  } |  |
|    if( alf_cc_cr_filter_signal_flag ) { |  |
|    alf_cc_cr_filters_signalled_minus1 | ue(v) |
|    for( k = 0; k < alf_cc_cr_filters_signalled_minus1 + 1; k++ ) { |  |
|      for( j = 0; j < 7; j++ ) { |  |
|        alf_cc_cr_mapped_coeff_abs[ k ][ j ] | u(3) |
|        if( alf_cc_cr_mapped_coeff_abs[ k ][ j ] ) |  |
|          alf_cc_cr_coeff_sign[ k ][ j ] | u(1) |
|      } |  |
|    } |  |
|  } |  |
| } |  |

Syntax Tables for Explicit Scaling List APS Data:
7.3.2.21 Scaling List Data Synitax

|  | Descriptor |
|---|---|
| scaling_list_data( ) { |  |
|    scaling_matrix_for_lfnst_disabled_flag | u(1) |
|    scaling_list_chroma_present_flag | u(1) |
|    for( id = 0; id < 28; id ++ ) |  |
|      matrixSize = (id < 2) ? 2: ( (id < 8 ) ? 4 : 8 ) |  |
|      if( scaling_list_chroma_present_flag \|\| ( id % 3 = = 2) \|\| ( id = = 27 ) ) { |  |
|        scaling_list_copy_mode_flag[ id ] | u(1) |

-continued

| | Descriptor |
|---|---|
| if( !scaling_list_copy_mode_flag[ id ] ) | |
|    scaling_list_pred_mode_flag[ id ] | u(1) |
| if( ( scaling_list_copy_mode_flag[ id ] \|\| scaling_list_pred_mode_flag[ id ] ) && | |
|    id != 0 && id != 2 && id != 8 ) | |
|    scaling_list_pred_id_delta[ id ] | ue(v) |
| if( !scaling_list_copy_mode_flag[ id ] ) { | |
|    nextCoef = 0 | |
|    if( id > 13 ) { | |
|      scaling_list_dc_coef[ id − 14 ] | se(v) |
|      nextCoef += scaling_list_dc_coef[ id − 14 ] | |
|    } | |
|    for( i = 0; i < matrixSize * matrixSize; i++ ) { | |
|      x = DiagScanOrder[ 3 ][ 3 ][ i ][ 0 ] | |
|      y = DiagScanOrder[ 3 ][ 3 ][ i ][ 1 ] | |
|      if( !( id > 25 && x >= 4 && y >= 4 ) ) { | |
|         scaling_list_delta_coef[ id ][ i ] | se(v) |
|         nextCoef += scaling_list_delta_coef[ id ][ i ] | |
|      } | |
|      ScalingList[ id ][ i ] = nextCoef | |
|    } | |
| } | |
| } | |

7.3.2.20 Luma Mapping with Chroma Scaling Data Syntax

| | Descriptor |
|---|---|
| lmcs_data( ) { | |
|   lmcs_min_bin_idx | ue(v) |
|   lmcs_delta_max_bin_idx | ue(v) |
|   lmcs_delta_cw_prec_minus1 | ue(v) |
|   for( i = lmcs_min_bin_idx; i <= LmcsMaxBinIdx; i++ ) { | |
|     lmcs_delta_abs_cw[ i ] | u(v) |
|     if( lmcs_delta_abs_cw[ i ] > 0 ) | |
|       lmcs_delta_sign_cw_flag[ i ] | u(1) |
|   } | |
|   lmcs_delta_abs_crs | u(3) |
|   if( lmcs_delta_abs_crs > 0 ) | |
|     lmcs_delta_sign_crs_flag | u(1) |
| } | |

Usage of ALF APS (on/off control and one or multiple APS indices, if needed) is signalled in either PH or SH, but not both. For a picture/slice, multiple ALF APSs may be signalled. For the explicit scaling list and LMCS, in PH, a flag is signaled to indicate the explicit scaling list and LMCS is enabled for at least one slice. And if it is enabled, one APS index is further signalled.

7.3.2.7 Picture Header Structure Syntax

| | Descriptor |
|---|---|
| picture_header_structure( ) { | |
| ... | |
|   if( sps_alf_enabled_flag && alf_info_in_ph_flag ) { | |
|     ph_alf_enabled_flag | u(1) |
|     if( ph_alf_enabled_flag ) { | |
|       ph_num_alf_aps_id_luma | u(3) |
|       for( i = 0; i < ph_num_alf_aps_ids_luma; i++ ) | |
|         ph_alf_aps_id_luma[ i ] | u(3) |
|       if( ChromaArrayType != 0 ) | |
|         ph_alf_chroma_idc | u(2) |
|       if( ph_alf_chroma_idc > 0 ) | |
|         ph_alf_aps_id_chroma | u(3) |

-continued

| | Descriptor |
|---|---|
|       if( sps_ccalf_enabled_flag ) { | |
|         ph_cc_alf_cb_enabled_flag | u(1) |
|         if( ph_cc_alf_cb_enabled_flag ) | |
|           ph_cc_alf_cb_aps_id | u(3) |
|         ph_cc_alf_cr_enabled_flag | u(1) |
|         if( ph_cc_alf_cr_enabled_flag ) | |
|           ph_cc_alf_cr_aps_id | u(3) |
|       } | |
|     } | |
|   } | |
|   if( sps_lmcs_enabled_flag ) { | |
|     ph_lmcs_enabled_flag | u(1) |
|     if( ph_lmcs_enabled_flag ) { | |
|       ph_lmcs_aps_id | u(2) |
|       if( ChromaArrayType != 0 ) | |
|         ph_chroma_residual_scale_flag | u(1) |
|     } | |
|   } | |
|   if( sps_explicit_scaling_list_enabled_flag ) { | |
|     ph_explicit_scaling_list_enabled_flag | u(1) |
|     if( ph_explicit_scaling_list_enabled_flag ) | |
|       ph_scaling_list_aps_id | u(3) |
|   } | |

4. Technical Problems Solved by Disclosed Technical Solutions

The current VVC text and recent progress in JVET have the following problems:

1. In the latest VVC draft text (in JVET-Q2001-vE/v15), two PH syntax elements related to allowed slice types are included, i.e., ph_inter_slice_allowed_flag and ph_intra_slice_allowed_flag, as tabulated in the picture header structure syntax. With these two flags, syntax elements related to I slice coding are signalled only when the ph_intra_slice_allowed_flag is true, and syntax elements related to inter slice coding are signalled only when the ph_inter_slice_allowed_flag is true. However, when ph_inter_slice_allowed_flag is equal to 1, the decoder does not know whether the picture contains B slices. Some applications, e.g., online gaming, video conference, video surveillance, often use only P and I slices. Therefore, if there is an indication of whether B slices are allowed, the decoders of such applications would be able to choose to only request/ use bitstreams that do not B slices included, and in addition, the indication can be used to avoid sending of multiple unnecessary parameters.
2. In JVET-R0052, the suggested changes are only applied to PH and SH. There is no higher-level control whether it can only have the same slice types within a picture or not and/or what kinds of allowed slice types are enabled in a picture. In addition, when certain syntax elements related to bi-prediction only are not present, how to infer the values are not described.
3. In the item 1 of JVET-R0191, it is proposed to replace the constraint that the value of sps_ptl_dpb_hrd_params_present_flag shall be equal to vps_independent_layer_flag[GeneralLayerIdx[nuh_layer_id]] with the following: The value of sps_ptl_dpb_hrd_params_present_flag shall be equal to 1 when there is an OLS that contains only one layer and the layer ID is equal to nuh_layer_id of the SPS.

However, the change introduces a VPS dependency through the condition "when there is an OLS that contains only one layer". Another issue is that for a single-layer bitstream, the value of sps_ptl_dpb_hrd_params_present_flag shall be equal to 1, and this is not captured by the changed constraint.
4. In JVET-R0267, the following constraint was proposed: When the current picture is an IDR picture and sps_idr_rpl_present_flag is equal to 1, there shall be no picture referred to by an entry in RefPicList[0] or RefPicList[1] that precedes, in output order or decoding order, any preceding IRAP picture in decoding order (when present).

However, the constraint only applies to single layer bitstreams.
5. In JVET-R0042, the changes summarized as follows were proposed to VVC:
   1) For each picture type, a corresponding subpicture type is defined.
   2) The terms "associated GDR subpicture" and "associated IRAP subpicture" are also defined.
   3) The content of a NAL unit with nal_unit_type equal to CRA_NUT is called "coded slice of a CRA picture or subpicture" instead of "coded slice of a CRA picture". Similarly for other VCL NAL unit types.
   4) It is required that any two neighboring subpictures with different NAL unit types within a picture shall both have the subpic_treated_as_pic_flag[ ] equal to 1.
   5) Similar constraints for different types of pictures and the same-layer pictures in the preceding and succeeding AUs in terms of relative decoding order, output order, and prediction relationship are specified in the subpicture domain for different types of subpictures and the same-layer subpictures with the same subpicture index in preceding and succeeding AUs.

However, there lacks a constraint on the RPL entries for IDR subpictures.
6. JVET-R0065 proposed the following changes to VVC:
   1) Each GDR AU is required to be complete (i.e., to have a picture for each of the layers present in the CVS). That means, an incomplete AU consisting of GDR pictures is not a GDR AU, similarly as in the current VVC text that an incomplete AU consisting of IRAP pictures is not an IRAP AU.
   2) Add a flag named irap_or_gdr_au_flag to the AUD to specify whether the AU is an IRAP or GDR AU, and mandate the presence of an AUD NAL unit in each IRAP or GDR AU when vps_max_layers_minus1 is greater than 0.

However, if an IRAP or GDR AU is not required to be complete, but are required that each picture in the AU is an IRAP or GDR picture, there still needs to be an indication of whether an AU is an IRAP or GDR AU, to enable the decoder to be able to figure out that an AU is an IRAP or GDR AU after receiving the first VCL NAL unit of the first picture. Without such an indication, the decoder won't be able to know this until after it receives the last picture of the AU (when the last picture received is in the highest layer of the OLS) or until after it receives the first NAL unit of the next AU (when the last picture received is not in the highest layer of the OLS).
7. JVET-R0063 proposed to replace the PH flag ph_lmcs_enabled_flag with a 2-bit ph_lmcs_mode_idc, with 3 modes specified: disabled (mode 0), used for all slices (mode 1), and enabled (mode 2). In mode 1, the LMCS is used for all slices of a picture, and no signalling of LMCS control flag is needed in the SH. The semantics of slice_lmcs_enabled_flag is revised accordingly. In addition, fixes of the semantics of ph_chroma_residual_scale_flag were proposed to reflect the intention of enabling/disabling chroma residual scaling for a picture or slice. However, the proposed ph_lmcs_mode_idc in JVET-R0063 may also be ue(v) coded.
8. JVET-R0064 proposed that the PH flag ph_explicit_scaling_list_enabled_flag is replaced with a 2-bit ph_explicit_scaling_list_mode_idc, with 3 modes specified: disabled (mode 0), used for all slices (mode 1), and enabled (mode 2). In mode 1, the explicit scaling list is used for all slices of a picture, and no scaling list signalling is needed in the SH. However, the proposed ph_explicit_scaling_list_mode_idc in JVET-R0064 may also be ue(v) coded.

5. A Listing of Example Solutions and Embodiments

To solve the above problem, methods as summarized below are disclosed. The items below should be considered as examples to explain the general concepts and should not be interpreted in a narrow way. Furthermore, these items can be applied individually or combined in any manner.

One or more syntax elements may be added in parameter sets (e.g., SPS, VPS, PPS, APS, DCI) and/or General constraint information syntax to indicate whether only X (e.g., I, or B or P) slice is allowed within a picture; and/or to indicate the allowed set of slice types in a picture.

In Parameter Set and General Constraint Information Syntax
1. In a video unit such as SPS or PPS, add one or multiple syntax elements (e.g., sps_allowed_slice_idc) to specify whether the allowed slice types in a picture of a CLVS.
   1) In one example, a first syntax element (e.g., sps_allowed_slice_idc) is added, and its semantics may be defined as: sps_allowed_slice_idc equal to X specifies that a picture only allows the following allowed slice types or any combination of them:

i. {all I}, {all P}, {all B}, {I, P}, {I, B}, {P, B}, {I, B, P}
ii. In one example, the first syntax element may be coded with fixed length (e.g. u(1), u(2) or U(3)), unary coded, truncated unary coded, EG coded.
iii. Alternatively, furthermore, signalling and/or semantics and/or inference of one or multiple syntax elements signalled in SPS or PPS may be modified such that they are signalled only when the first syntax element satisfies certain conditions.
   a. In one example, the one or multiple syntax elements are those for enabling a coding tool which requires more than one prediction signal, such as bi-prediction or mixed intra and inter coding, or prediction with linear/non-linear weighting from multiple prediction blocks.
   b. In one example, the one or multiple syntax elements may include, but not limited to:
      a) sps_weighted_bipred_flag
      b) sps_bdof_enabled_flag
      c) sps_smvd_enabled_flag
      d) sps_dmvr_enabled_flag
      e) sps_bcw_enabled_flag
      f) sps_ciip_enabled_flag
      g) sps_gpm_enabled_flag
   c. In one example, only when the first syntax element specifies that the CLVS associated with the video unit may contain one or more B slices, the one or multiple syntax elements may be signalled. Otherwise, the signalling is skipped, and the values of the syntax element are inferred.
   d. In one example, when sps_b_slice_allowed_flag is equal to 0, the syntax elements sps_weighted_bipred_flag, sps_bdof_enabled_flag, sps_smvd_enabled_flag, sps_dmvr_enabled_flag, sps_bcw_enabled_flag, sps_ciip_enabled_flag, and sps_gpm_enabled_flag are not signalled and their values are inferred.
      a) In one example, they are all inferred to be 0 when not present.
iv. Alternatively, furthermore, a second syntax element may be signalled in the General constraint information syntax, such as no_b_slice_contraint_flag, to indicate whether the first syntax element shall be equal to 0.
   a. In one example, the semantics of the no_b_slice_contraint_flag is defined as follows:
   no_b_slice_contraint_flag equal to 1 specifies that sps_allowed_slice_idc shall be equal to X (e.g., representing the allowed slice types to be {I, B, P} or {B, P}, {all B}). no_b_slice_constraint_flag equal to 0 does not impose such a constraint.
v. Alternatively, furthermore, it is required that one or multiple syntax elements signalled in the General constraint information syntax shall be equal to 1 if the first syntax element specifies that the CLVS doesn't contain B slices (e.g., only sps_allowed_slice_idc equal to X which represents {I, P}, {all I}, {all P}).
   a. In one example, the one or multiple syntax elements may include, but are not limited to:
      a) no_bcw_constraint_flag
      b) no_ciip_constraint_flag
      c) no_gpm_constraint_flag
      d) no_bdof_constraint_flag
      e) no_dmvr_constraint_flag
vi. Alternatively, furthermore, signalling and semantics of one or multiple syntax elements signalled in dpb_parameters ( ) may be modified such that they are signalled only when the first syntax element satisfies certain conditions.
   a. In one example, the one or multiple syntax elements may include, but not limited to:
      a) max_num_reorder_pics
   b. In one example, when the first syntax element tells no B slice is allowed, the max_num_reorder_pics is not signalled and inferred to be 0.

In PH/SH
2. In the PH/SH, a variable X is used to indicate whether B slice is allowed/used in a picture/slice, and the variable may be derived from the SPS syntax element, and/or a new PH syntax element (e.g., ph_allowed_slice_idc) to specify the allowed slice types, and/or other syntax elements (e.g., the BSliceAllowed used in JVET-R0052).
   1) In one example, the new PH syntax element is added and how to signal this syntax element may depend on the allowed slice types in SPS.
   2) Alternatively, furthermore, signalling and/or semantics and/or inference of one or multiple syntax elements signalled in PH may be modified according to the variable.
      i. In one example, the one or multiple syntax elements are those for enabling a coding tool which requires more than one prediction signal, such as bi-prediction or mixed intra and inter coding, or prediction with linear/non-linear weighting from multiple prediction blocks.
      ii. In one example, the one or multiple syntax elements may include, but not limited to:
         a) ph_collocated_from_l0_flag
         b) mvd_l1_zero_flag
         c) ph_disable_bdof_flag
         d) ph_disable_dmvr_flag
         e) num_l1_weights
      iii. In one example, only when the first syntax element specifies that the picture may contain one or more B slices, the one or multiple syntax elements may be signalled. Otherwise, the signalling is skipped, and the values of the syntax element are inferred.
         a) Alternatively, furthermore, whether to signal the one or more syntax elements may depend on the first syntax elements in bullet 1.1) and 2.1), such as (X being true or 1).
         b) ph_disable_bdof_flag may be signalled only when (sps_bdof_pic_present_flag && X) is true.
         c) ph_disable_dmvr_flag may be signalled only when (sps_dmvr_pic_present_flag && X) is true.
      iv. In one example, when X is equal to 0 (or false), mvd_l1_zero_flag is not signalled, and its values is inferred to be 1.
      v. In one example, the inference of the one or multiple syntax elements are dependent on the value of the first syntax element.
         a) In one example, for the ph_disable_bdof_flag, the following applies:

If sps_bdof_enabled_flag is equal to 1 and X is equal to 1 (or true), the value of ph_disable_bdof_flag is inferred to be equal to 0.
Otherwise (sps_bdof_enabled_flag is equal to 0 or X is equal to 0 (or false)), the value of ph_disable_bdof_flag is inferred to be equal to 1.
b) In one example, for the ph_disable_dmvr_flag, the following applies:
If sps_dmvr_enabled_flag is equal to 1 and X is equal to 1 (or true), the value of ph_disable_dmvr_flag is inferred to be equal to 0.
Otherwise (sps_dmvr_enabled_flag is equal to 0 or X is equal to 0 (or false)), the value of ph_disable_dmvr_flag is inferred to be equal to 1.
c) In one example, when ph_temporal_mvp_enabled_flag and rpl_info_in_ph_flag are both equal to 1 and X is equal to 0 (or false), the value of ph_collocated_from_l0_flag is inferred to be equal to 1.
d) In one example, when X is equal to 0 (or false), num_l1_weights is not signalled and its value is inferred to be 0, and, consequently, weighted prediction parameters for reference picture list 1 are not signalled in the PH or SHs of the picture.

Inference of Syntax Elements

3. For syntax elements which are related to a coding tool X and/or a group of syntax elements which could be present in either A (e.g., a PH) or B (e.g., a SH) but not both, if the A is included in the B, then at least one of indication of presence of those syntax elements may be not signalled, and may be inferred to be 0, i.e., present in B.
   1) In one example, the coding tool X may include one of the followings:
      i. In-loop filtering technologies, e.g., deblocking filter, ALF, SAO
      ii. Weighted Prediction
      iii. QP delta information
      iv. RPL information
   2) In one example, the condition 'the A is included in the B' may be defined as 'slice headers referring to the PPS contain the PH syntax structure', or 'current picture only consists of one slice'.
   3) In one example, the 'indication of presence of those syntax elements' may be defined as one or multiple of the following syntax elements:
      i. qp_delta_info_in_ph_flag, rpl_info_in_ph_flag, dbf_info_in_ph_flag, sao_info_in_ph_flag, wp_info_in_ph_flag, alf_info_in_ph_flag
   4) In one example, one or multiple of the following changes are proposed.
      rpl_info_in_ph_flag equal to 1 specifies that reference picture list information is present in the PH syntax structure and not present in slice headers referring to the PPS that do not contain a PH syntax structure. rpl_info_in_ph_flag equal to 0 specifies that reference picture list information is not present in the PH syntax structure and may be present in slice headers referring to the PPS that do not contain a PH syntax structure. When slice headers referring to the PPS contain the PH syntax structure, it is a requirement of bitstream conformance that rpl_info_in_ph_flag shall be equal to 0. dbf_info_in_ph_flag equal to 1 specifies that deblocking filter information is present in the PH syntax structure and not present in slice headers referring to the PPS that do not contain a PH syntax structure. dbf_info_in_ph_flag equal to 0 specifies that deblocking filter information is not present in the PH syntax structure and may be present in slice headers referring to the PPS that do not contain a PH syntax structure. When not present, the value of dbf_info_in_ph_flag is inferred to be equal to 0. When slice headers referring to the PPS contain the PH syntax structure, it is a requirement of bitstream conformance that dbf_info_in_ph_flag shall be equal to 0.
      sao_info_in_ph_flag equal to 1 specifies that SAO filter information is present in the PH syntax structure and not present in slice headers referring to the PPS that do not contain a PH syntax structure. sao_info_in_ph_flag equal to 0 specifies that SAO filter information is not present in the PH syntax structure and may be present in slice headers referring to the PPS that do not contain a PH syntax structure. When slice headers referring to the PPS contain the PH syntax structure, it is a requirement of bitstream conformance that sao_info_in_ph_flag shall be equal to 0.
      alf_info_in_ph_flag equal to 1 specifies that ALF information is present in the PH syntax structure and not present in slice headers referring to the PPS that do not contain a PH syntax structure. alf_info_in_ph_flag equal to 0 specifies that ALF information is not present in the PH syntax structure and may be present in slice headers referring to the PPS that do not contain a PH syntax structure. When slice headers referring to the PPS contain the PH syntax structure, it is a requirement of bitstream conformance that alf_info_in_ph_flag shall be equal to 0.
      wp_info_in_ph_flag equal to 1 specifies that weighted prediction information may be present in the PH syntax structure and not present in slice headers referring to the PPS that do not contain a PH syntax structure. wp_info_in_ph_flag equal to 0 specifies that weighted prediction information is not present in the PH syntax structure and may be present in slice headers referring to the PPS that do not contain a PH syntax structure. When not present, the value of wp_info_in_ph_flag is inferred to be equal to 0. When slice headers referring to the PPS contain the PH syntax structure, it is a requirement of bitstream conformance that wp_info_in_ph_flag shall be equal to 0.
      qp_delta_info_in_ph_flag equal to 1 specifies that QP delta information is present in the PH syntax structure and not present in slice headers referring to the PPS that do not contain a PH syntax structure. qp_delta_info_in_ph_flag equal to 0 specifies that QP delta information is not present in the PH syntax structure and may be present in slice headers referring to the PPS that do not contain a PH syntax structure. When slice headers referring to the PPS contain the PH syntax structure, it is a requirement of bitstream conformance that qp_delta_info_in_ph_flag shall be equal to 0.
4. A conformance bitstream shall follow the rule that it is require the setting of NoOutputOfPriorPicsFlag to be equal to 1 for the splicing-piont picture that is a CLVS AU in the spliced bitstream when its POC value is greater than the POC value of the previous picture.
1) When the current AU is a coded video sequence start (CVSS) AU and PicOrderCntVal of the current AU is greater than the PicOrderCntVal of the previous picture in decoding order, the value of NoOutputOfPriorPicsFlag is set equal to 1 regardless of other conditions (e.g., regardless of the values of the no_output_of_prior_pics_flag of the pictures in the current AU).
5. Whether to signal a syntax element which indicates inter slices/B slices/P slices is allowed in a picture and/or RPL/WP information, and/or indication of presence of RPL/WP information may be dependent on the picture type and layer independency is enabled or not.
1) Whether to signal a syntax element which indicates inter slices/B slices/P slices is allowed in a picture and/or RPL/WP information, and/or indication of presence of RPL/WP information may be dependent on the picture type and one of whether the layer is an independent layer and whether the CLVS contains only one layer.
2) In one example, the syntax element may be signaled in a picture header (PH) or in a PPS.
3) In one example, whether to signal the syntax element may depend on one or multiple syntax elements signaled in a higher level video unit (such as SPS)
4) In one example, the syntax element is not signalled for IRAP pictures and layer independency is enabled.
1. Alternatively, the syntax element is not signalled for IRAP pictures or slices in independent layers.
  ii. In one example, ph_inter_slice_allowed_flag in VVC is not signalled for IRAP pictures and layer independency is enabled.
  iii. In one example, slice_type in VVC is not signalled for IRAP pictures and layer independency is enabled.
  iv. In one example, ph_slice_type in JVET-R0052 is not signalled for IRAP pictures and layer independency is enabled.
  v. In one example, ph_inter_slice_allowed_flag in VVC is not signalled for an IRAP picture (i.e., a picture for which all the coded slice NAL units have nal_unit_type equal to IDR_W_RADL, IDR_N_LP, or CRA_NUT) in an independent layer (i.e., a layer for which vps_independent_layer_flag[GeneralLayerIdx[nuh_layer_id]] is equal to 1), and is inferred to be equal to 0.
  vi. In one example, slice_type in VVC is not signalled for an IRAP slice (i.e., a coded slice NAL unit with nal_unit_type equal to IDR_W_RADL, IDR_N_LP, or CRA_NUT) in an independent layer, and is inferred to be equal to 2.
  Vii. In one example, ph_slice_type in JVET-R0052 is not signalled for an IRAP picture in an independent layer, and is inferred to be equal to 2.
5) In one example, the syntax element is not signalled for IRAP pictures or slices in a single-layer CLVS.
  i. In one example, ph_inter_slice_allowed_flag in VVC is not signalled for an IRAP picture (i.e., a picture for which all the coded slice NAL units have nal_unit_type equal to IDR_W_RADL, IDR_N_LP, or CRA_NUT) when the CLVS contains only one layer (i.e., when sps_video_parameter_set_id is equal to 0), and is inferred to be equal to 0.
  ii. In one example, slice_type in VVC is not signalled for an IRAP slice (i.e., a coded slice NAL unit with nal_unit_type equal to IDR_W_RADL, IDR_N_LP, or CRA_NUT) when the CLVS contains only one layer.
  iii. In one example, ph_slice_type in JVET-R0052 is not signalled for an IRAP picture when the CLVS contains only one layer.
6) In one example, the syntax element is not signalled for IRAP pictures and layer independency is enabled, even the presence of such information tells they are in PH.
  i. In one example, the syntax element is not signalled for IRAP pictures in independent layers, even when the presence of such information tells they are in PH.
  ii. When gdr_or_irap_pic_flag is equal to 1 and gdr_pic_flag is equal to 0, a new flag called idr_pic_flag is proposed to specify whether the picture associated with the picture header is an IDR picture. And the following may be applied:
    a. When sps_idr_rpl_present_flag is equal to 0, layer independency is enabled, and idr_pic_flag is equal to 1, RPL signalling is not present in the PH, even when the value of rpl_info_in_ph_flag is equal to 1.
    b. When sps_idr_rpl_present_flag is equal to 0, layer independency is enabled, and idrpic_flag is equal to 1, WP signalling is not present in the PH, even when the value of wp_info_in_ph_flag is equal to 1.
    c. When sps_idr_rpl_present_flag is equal to 0, the current layer is an independent layer (i.e., vps_independent_layer_flag[GeneralLayerIdx[nuh_layer_id]] is equal to 1), and idr_pic_flag is equal to 1, RPL signalling is not present in the PH, even when the value of rpl_info_in_ph_flag is equal to 1.
    d. When sps_idr_rpl_present_flag is equal to 0, the current layer is an independent layer, and idr_pic_flag is equal to 1, WP signalling is not present in the PH, even when the value of wp_info_in_ph_flag is equal to 1.
7) In one example, the syntax element is not signalled for IRAP pictures in a single-layer CLVS, even when the presence of such information tells they are in PH.
  i. When gdr_or_irap_pic_flag is equal to 1 and gdr_pic_flag is equal to 0, a new flag called idr_pic_flag is proposed to specify whether the picture associated with the picture header is an IDR picture. And the following may be applied:
    a. When sps_idr_rpl_present_flag is equal to 0, the CLVS contains only one layer (i.e., sps_video_parameter_set_id is equal to 0), and idr_pic_flag is equal to 1, RPL signalling is not present in the PH, even when the value of rpl_info_in_ph_flag is equal to 1.
    b. When sps_idr_rpl_present_flag is equal to 0, CLVS contains only one layer, and idr_pic_flag is equal to 1, WP signalling is not present in the PH, even when the value of wp_info_in_ph_flag is equal to 1.
6. It is proposed that when sps_video_parameter_set_id is greater than 0 and there is an OLS that contains only one layer with nuh_layer_id equal to the nuh_layer_id of the SPS, or sps_video_parameter_set_id is equal to 0, the value of sps_ptl_dpb_hrd_params_present_flag shall be equal to 1.

Reference List Related

7. The signaling and/or generating of reference picture list may depend on the allowed slice types in a picture of a CLVS.
   1) For example, one or multiple syntax elememnts to build reference list 1 may not be signlaed if B-slices are not allowed in a CLVS.
   2) For example, one or multiple procedures to build reference list 1 may not be conducted if B-slices are not allowed in a CLVS.

APS Related

8. It is required that two APSSs shall not have the same APS_id in a sequence, in a CLVS or in a bit-stream.
   1) Alternatively, it is required that two APSs with the same APS type (such as ALF APS or LMCS APS) shall not have the same APS_id in a sequence, in a CLVS or in a bit-stream.
   2) Alternatively, it is allowd that two APSs with the same APS type (such as ALF APS or LMCS APS) have the same APS_id, but they must have the same contents in a sequence, in a CLVS or in a bit-stream.
   3) Alternatively, it is allowd that two APSs with the same APS type (such as ALF APS or LMCS APS) have the same APS_id. And the APS signaled earlier is replaced by the APS signaled latter.
   4) Alternatively, it is allowd that two APSs with the same APS type (such as ALF APS or LMCS APS) have the same APS_id. And the APS signaled latter is ignored.
9. Two different parameter sets (e.g., APS and SPS) may be dependent on each other, and the syntax element or a variable derived according to syntax element in a first parameter set could be used for conditionally signalling another syntax element in a second parameter set.
   1) Alternatively, and the syntax element or a variable derived according to syntax element in a first parameter set could be used derive value of another syntax element in a second parameter set.

Noncoded Subpicture Related

10. It is proposed that a boundary of a noncoded subpicture must be treated as a picture boundary.
11. It is proposed that loop filtering (such as ALF/deblcoking/SAO) cannot cross a boundary of a non-coded subpicture.
12. It is required that if there is only one subpicture, it cannot be a noncoded subpicture.
13. It is required that a noncoded subpicture cannot be extracted.
14. It is proposed that the information related to noncoded subpicture(s) may be signaled in a SEI message.
15. It is required that a noncoded subpicture can only have one slice.
16. It is required that the top-left subpicture cannot be a noncoded subpicture.
17. It required that at least one of the subpictures is not noncoded subpictures.
18. Whether and/or how to code side information related subpictures may be dependent on whether a subpicture is noncoded subpicture.
    1) In one example, if it is noncoded subpicture, no need to signal the side information.
19. Alternatively, furthermore, for above requirements, they may be revised as conditionally signalling according to above cases IDR Picture and IDR Subpicture Related 20. The following constraint is proposed:
    When the current picture, with nuh_layer_id equal to a particular value layerId, is an IDR picture and sps_idr_rpl_present_flag is equal to 1, there shall be no picture referred to by an entry in RefPicList[0] or RefPicList[1] that precedes, in output order or decoding order, any preceding IRAP picture with nuh_layer_id equal to layerId in decoding order (when present).
21. The following constraint is proposed:
    When the current subpicture, with nuh_layer_id equal to a particular value layerId and subpicture index equal to a particular value subpicIdx, is an IDR subpicture and sps_idr_rpl_present_flag is equal to 1, there shall be no picture referred to by an entry in RefPicList[0] or RefPicList[1] that precedes, in output order or decoding order, any picture containing a preceding IRAP subpicture with nuh_layer_id equal to layerId and subpicture index equal to subpicIdx in decoding order (when present).

IDR or GDR AU related

22. An IRAP AU is not required to be complete, a GDR AU is not required to be complete, and an indication of whether an AU is an IRAP or GDR AU may be signalled for each IRAP or GDR AU, in the AUD, the PH of pictures in the lowest layer specified by the VPS, or in an SEI message.
    1) In one example, the signalling of the indication is optional.
    2) In one example, the following changes are proposed to VVC (Added or modified are shown in Courier New font, and deleted parts are marked with double brackets (e.g., [[a]] denotes the deletion of the character 'a')):
       coded video sequence start (CVSS) AU: An AU in which [[there is a PU for each layer in the CVS and]] the coded picture in each PU is a CLVSSpicture.
       intra random access point (IRAP) AU: An AU in which [[there is a PU for each layer in the CVS and]] the coded picture in each PU is an IRAP picture.
       The AUD syntax and semantics are changed as follows:

|  | Descriptor |
| --- | --- |
| access_unit_delimiter_rbsp( ) { |  |
|   irap_or_gdr_au_flag | u(1) |
|   pic_type | u(3) |
|   rbsp_trailing_bits( ) |  |
| } |  |

The AU delimiter is used to indicate the start of an AU, whether the AU is an IRAP or GDR AU, and the type of slices present in the coded pictures in the AU containing the AU delimiter NAL unit. There is no normative decoding process associated with the AU delimiter.
irap_or_gdr_au_flag equal to 1 specifies that the AU containing the AU delimiter is an IRAP or GDR AU.

irap_or_gdr_au_flag equal to 0 specifies that the AU containing the AU delimiter is not an IRAP or GDR AU.

. . .

The order of AUs and their association to CVSs is changed as follows:
A bitstream consists of one or more CVSs.
A CVS consists of one or more AUs. The order of PUs and their association to AUs are described in clause 7.4.2.4.3.
The first AU of a CVS is a CVSS AU, wherein each present PU is a CLVSS PU, which is either an IRAP PU with NoOutputBeforeRecoveryFlag equal to 1 or a GDR PU with NoOutputBeforeRecoveryFlag equal to 1.
[[Each CVSS AU shall have a PU for each of the layers present in the CVS.]]

On Allowed Slice Types

23. Whether to signal indication of allowed X (e.g., X being intra/inter/B/P) slice types within a picture may depend on the layout of slices within a picture and/or whether current picture is IRAP and inter layer dependency is enabled or disabled.
  1) In one example, whether to signal indication of allowed slice types (e.g., ph_intra_slice_allowed_flag) within a picture may depend on whether the PPS indicates only slice per picture is applied and/or no picture partition is used and/or rectangular slice and only one slice per picture are used and/or the picture is partitioned into rectangular slices.
    i. In one example, whether to signal the indications may depend on the condition check of "(!no_pic_partition_flag && !(rect_slice_flag && num_slices_in_pic_minus1==0)"
    ii. Alternatively, furthermore, if the indication is not signalled, the inference of the indication may further depend on the whether the PPS indicates only slice per picture is applied and/or no picture partition is used and/or rectangular slice and only one slice per picture are used.
      a. In one example, ph_intra_slice_allowed_flag equal to 0 specifies that all coded slices of the picture have slice_type equal to 0 or 1. ph_intra_slice_allowed_flag equal to 1 specifies that there may or may not be one or more coded slices in the picture that have slice_type equal to 2. When not present, the value of ph_intra_slice_allowed_flag is inferred to be equal to [[1]] (!no_pic_partition_flag && !(rect_slice_flag && num_slices_in_pic_minus1==0))? 1:0.
      b. Alternatively, when not present, the value of ph_intra_slice_allowed_flag is inferred to be equal to [[1]](no_pic_partition_flag||(rect_slice_flag && num_slices_in_pic_minus1==0))? 0:1.
  2) In one example, whether to signal indication of allowed slice types (e.g., ph_intra_slice_allowed_flag) within a picture may depend on one or multiple syntax elements signaled in a higher level video unit (such as SPS)
    i. Alternatively, furthermore, the inferred value of the indication of allowed slice types is dependent on those syntax elements signalled in the higher level video unit, if the indication of allowed slice types is not present.
  3) In one example, whether to signal indication of allowed slice types (e.g., ph_inter_slice_allowed_flag) within a picture may depend on whether current picture is an IRAP picture and inter layer dependency is disabled for all slices within the picture.
    i. Alternatively, furthermore, the inferred value of the ph_inter_slice_allowed_flag is set to 0/false if the current picture is an IRAP picture and inter layer dependency is disabled for all slices within the picture.
24. Whether to signal indication of allowed X (e.g., X being inter/B/P) slice types within a picture and/or the inferred values of the indications may depend on number of reference pictures (e.g., the num_ref_entries[0][RplsIdx[0]] and/or num_ref_entries[1][RplsIdx[1]]).
  1) In one example, if both num_ref_entries[0][RplsIdx[0]] and/or num_ref_entries[1][RplsIdx[I]] are equal to 0, the indication of allowed X (e.g., X being inter/B/P) slice types is not signalled, and/or further inferred to be false.
  2) In one example, if both num_ref_entries[0][RplsIdx[0]] and/or num_ref_entries[1][RplsIdx[1]] are equal to 0, a constraint is added that the signalled indication of allowed X (e.g., X being inter/B/P) slice types shall be equal to 0.
  3) In one example, if num_ref_entries[1][RplsIdx[1]] is equal to 0, the indication of allowed X (e.g., X being B) slice types is not signalled, and/or further inferred to be false.
  4) In one example, if num_ref_entries[1][RplsIdx[ ]] is equal to 0, a constraint is added that the signalled indication of allowed X (e.g., X being B) slice types shall be equal to 0.
  5) In one example, if num_ref_entries[1][RplsIdx[1]] is equal to 0, a constraint is added that the mvd_l1_zero_flag, and/or ph_collocated_from_l0_flag, and/or ph_disable_bdof_flag and/or ph_disable_dmvr_flag shall be equal to 1.

On ALF APS

25. A constraint may be added for the ALF APS that at least one of the four syntax elements (alf_luma_filter_signal_flag, alf_chroma_filter_signal_flag, alf_cc_cb_filter_signal_flag, alf_cc_cr_filter_signal_flag in the VVC) shall be equal to 1.
  1) Alternatively, a constraint may be added for the ALF APS that at least one of the two syntax elements (alf_luma_filter_signal_flag, alf_chroma_filter_signal_flag) shall be equal to 1
26. Whether to/how to signal the indication of filter present flags and/or filter coefficients may depend on the previously coded information with the alf_data( ) structure and/or syntax elements in the Adaptation parameter set (APS) RBSP syntax.
  1) Alternatively, furthermore, if the indication and/or filter coefficients are not present, the inference values may also depend on the previously coded information with the alf_data( ) structure.
  2) In one example, whether to signal alf_cc_cr_filter_signal_flag may depend on whether all of the three syntax elements (alf_luma_filter_signal_flag, alf_chroma_filter_signal_flag, alf_cc_cb_filter_signal_flag, in the VVC) are equal to 0.
    i. Alternatively, furthermore, if all the three are equal to 0, the signalling of alf_cc_cr_filter_signal_flag is skipped, and/or further inferred to be true.

3) In one example, whether to signal alf_chroma_filter_signal_flag may depend on whether the alf_luma_filter_signal_flag in the VVC is equal to 0.
   i. Alternatively, furthermore, if alf_luma_filter_signal_flag is equal to 0, the signalling of alf_chroma_filter_signal_flag is skipped, and/or further inferred to be true.

On Scaling List/LMCS APS

27. It is proposed to allow using more than one X (e.g., X being explicit scaling list and/or LMCS an/or other coding tool with side information signalled in APSs) APSs within a picture/slice/tile/subpicture/brick/other video unit smaller than a picture.
   1) Alternatively, furthermore, number of X APSs to be utilized may be signalled in the bitstream (e.g., in PH/SH).
   2) Alternatively, furthermore, indices of X APSs to be utilized may be signalled in the bitstream (e.g., in PH/SH).
28. It is proposed to the X (e.g., X being explicit scaling list and/or LMCS an/or other coding tool with side information signalled in APSs) APS to be used may be dependent on the color component.
   1) In one example, luma and chroma color components may choose different X APSs.
   2) In one example, number of X APSs to be utilized for luma and chroma components may be signalled separately in the bitstream (e.g., in PH/SH).
      i. Alternatively, furthermore, whether to signal the number for chroma components may depend on whether prediction/inheritance from APS for the luma component is enabled.
      ii. Alternatively, furthermore, whether to signal the number for chroma components may depend on whether the number of APS for the luma component is unequal to 0 or greater than 0.
   3) In one example, indices of X APSs to be utilized for luma and chroma components may be signalled separately may be signalled in the bitstream (e.g., in PH/SH).
29. How to signal the X (e.g., X being ALF/CC-ALF/explicit scaling list and/or LMCS an/or other coding tool with side information signalled in APSs) APS to be used may be dependent on the subpicture.
   1) In one example, for each subpicture, it may choose its on/off control and corresponding X APSs to be used.
      i. Alternatively, furthermore, for each subpicture, the on/off control and/or X APSs to be used may be signalled.

On Subpicture

30. It is proposed that how to infer the value of subpic_treated_as_pic_flag[i] (in the VVC) may depend on whether subpicture information is present.
   1) In one example, the semantics of subpic_treated_as_pic_flag[i] is revised as follows: subpic_treated_as_pic_flag[i] equal to 1 specifies that the i-th subpicture of each coded picture in the CLVS is treated as a picture in the decoding process excluding in-loop filtering operations. subpic_treated_as_pic_flag[i] equal to 0 specifies that the i-th subpicture of each coded picture in the CLVS is not treated as a picture in the decoding process excluding in-loop filtering operations. When not present, the value of subpic_treated_asPic_flag[i] is inferred to be equal to [[sps_independent_subpics_flag]] subpic_info-present_flag.

On Deblocking Filter

31. It is proposed that for the following cases, pps_deblocking_filter_disabled_flag equal to 1 specifies that the operation of deblocking filter is disabled for slices or pps_deblocking_filter_disabled_flag equal to 0 specifies that the operation of deblocking filter is disabled for a slice referring to the PPS.
   1) slice_deblocking_filter_disabled_flag and ph_deblockig_filter_disabled_flag are not present;
   2) deblocking_filter_override_enabled_flag is equal to 0;
   3) deblocking_filter_override_enabled_flag is equal to 1, dbf_info_in_ph_flag is equal to 1, ph_deblocking_filter_disabled_flag is equal to 1
   4) deblocking_filter_override_enabled_flag is equal to 1, dbf_info_in_ph_flag is equal to 0, slice_deblocking_filter_disabled_flag is equal to 1
32. It is proposed that for the following cases, pps_deblocking_filter_disabled_flag equal to 0 specifies that the operation of deblocking filter is applied for slices referring to the PPS or pps_deblocking_filter_disabled_flag equal to 0 specifies that the operation of deblocking filter is enabled for a slice referring to the PPS.
   1) slice_deblocking_filter_disabled_flag and ph_deblockig_filter_disabled_flag are not present;
   2) deblocking_filter_override_enabled_flag is equal to 0;
   3) deblocking_filter_override_enabled_flag is equal to 1, dbf_info_in_ph_flag is equal to 1, ph_deblocking_filter_disabled_flag is equal to 0
   4) deblocking_filter_override_enabled_flag is equal to 1, dbf_info_in_ph_flag is equal to 0, slice_deblocking_filter_disabled_flag is equal to 1

On JCCR

33. It is proposed that for the QP offsets used for JCCR (joint chroma residual coding) may be signalled in a video unit (larger than a slice) instead of just in slice level (i.e., the slice_joint_cbcr_qp_offset in the VVC).
   1) In one example, it may be signalled in sequence/picture level, such as in SPS/VPS/DCI/PPS/PH.
   2) In one example, it may be signalled in multiple levels (e.g., in picture and slice level).
      i. Alternatively, furthermore, whether to signal it in a second level may depend on whether it is signalled in a first level.
         a. In one example, it could be signalled in only one fo the multiple levels.
         b. In one example, an indication of which level to signal the QP offset may be signalled in the bitstream.
      ii. Alternatively, furthermore, overriding mechanism is applied, that is, it is signalled in a first (higher) and an override flag may be further signalled to indicate whether to signal in a second (lower, e.g., slice) level to override the signalled value in the first level (e.g., in picture).
         a. In one example, the overrdie flag may be signalled in the first level and/or second level.

On LMCS and Scaling List Signalling Control

34. It is proposed that the ph_lmcs_mode_idc in JVET-R0063 may be ue(v) coded, and the value of ph_lmcs_mode_idc may be specified to be in the range of 0 to 2, inclusive. The semantics of the cases when ph_lmcs_mode_idc equal to 0, 1, or 2 are the same as in JVET-R0063.
   1) Alternatively, the ph__lmcs_mode_idc in JVET-R0063 may be ue(v) coded, and the value of ph_lmcs_mode_idc may be specified to be in the range of 0 to 1, inclusive, if it is known that the picture contains only one slice, and specified to be in the range of 0 to 2, inclusive, otherwise. The semantics of the cases when ph_lmcs_mode_idc equal to 0, 1, or 2 are the same as in JVET-R0063.

2) Alternatively, if it is known that the picture contains only one slice, the ph_lmcs_mode_idc in JVET-R0063 may be coded using u(1), i.e., using just one bit as for a flag, such that value is equal to either 0 or 1; otherwise, the ph_lmcs_mode_idc in JVET-R0063 may be ue(v) coded, and the value of ph__lmcs_mode_idc may be specified to be in the range of 0 to 2, inclusive. The semantics of the cases when ph_lmcs_mode_idc equal to 0, 1, or 2 are the same as in JVET-R0063.

35. It is proposed that the ph_explicit_scaling_list_mode_idc in JVET-R0064 may be ue(v) coded, and the value of ph_explicit_scaling_list_mode_idc may be specified to be in the range of 0 to 2, inclusive. The semantics of the cases when ph_explicit_scaling_list_mode_idc equal to 0, 1, or 2 are the same as in JVET-R0064.

1) Alternatively, the ph_explicit_scaling_list_mode_idc in JVET-R0064 may be ue(v) coded, and the value of ph_explicit_scaling_list_mode_idc may be specified to be in the range of 0 to 1, inclusive, if it is known that the picture contains only one slice, and specified to be in the range of 0 to 2, inclusive, otherwise. The semantics of the cases when ph_explicit_scaling_list_mode_idc equal to 0, 1, or 2 are the same as in JVET-R0064.

2) Alternatively, if it is known that the picture contains only one slice, the ph_explicit_scaling_list_mode_idc in JVET-R0064 may be coded using u(1), i.e., using just one bit as for a flag, such that value is equal to either 0 or 1; otherwise, the ph_explicit_scaling_list_mode_idc in JVET-R0064 may be ue(v) coded, and the value of ph_explicit_scaling_list_mode_idc may be specified to be in the range of 0 to 2, inclusive. The semantics of the cases when ph_explicit_scaling_list_mode_idc equal to 0, 1, or 2 are the same as in JVET-R0064.

6. Embodiments 6.1. Embodiment #1

7.3.2.3 Sequence Parameter Set RBSP Syntax

| | Descriptor |
|---|---|
| seq_parameter_set_rbsp( ) { | |
|   sps_seq_parameter_set_id | u(4) |
|   sps_video_parameter_set_id | u(4) |
|   sps_max_sublayers_minus1 | u(3) |
|   sps_reserved_zero_4bits | u(4) |
|   sps_ptl_dpb_hrd_params_present_flag | u(1) |
|   sps_b_slice_allowed_flag | u(1) |
|   if( sps_ptl_dpb_hrd_params_present_flag ) | |
|     profile_tier_level( 1, sps_max_sublayers_minus1 ) | |
| ... | u(1) |
|   sps_weighted_pred_flag | u(1) |
|   if ( sps_b_slice_allowed_flag ) | |
|     sps_weighted_bipred_flag | u(1) |
|   log2_max_pic_order_cnt_lsb_minus4 | u(4) |
|   sps_poc_msb_flag | u(1) |
| ... | |
|   sps_amvr_enabled_flag | u(1) |
|   if ( sps_b_slice_allowed_flag ) { | |
|     sps_bdof_enabled_flag | u(1) |
|     if( sps_bdof_enabled_flag ) | |
|       sps_bdof_pic_present_flag | u(1) |
|     sps_smvd_enabled_flag | u(1) |
|     sps_dmvr_enabled_flag | u(1) |
|     if( sps_dmvr_enabled_flag) | |
|       sps_dmvr_pic_present_flag | u(1) |
|   } | |
|   sps_mmvd_enabled_flag | u(1) |
| ... | |
|   if ( sps_b_slice_allowed_flag ) | |
|     sps_bcw_enabled_flag | u(1) |
|   sps_ibc_enabled_flag | u(1) |
|   if( sps_ibc_enabled_flag ) | |
|     six_minus_max_num_ibc_merge_cand | ue(v) |
|   sps_ciip_enabled_flag | u(1) |
|   if( sps_mmvd_enabled_flag ) | |
|     sps_fpel_mmvd_enabled_flag | u(1) |
|   if( sps_b_slice_allowed_flag && MaxNumMergeCand >= 2 ) { | |
|     sps_gpm_enabled_flag | u(1) |
|     if( sps_gpm_enabled_flag && MaxNumMergeCand >= 3 ) | |
|       max_num_merge_cand_minus_max_num_gpm_cand | ue(v) |
|   } | |
| ... | |
| } | |

...

sps_b_slice_allowed_flag equal to 0 specifies that none of the coded slices of the CLVS has slice_type equal to 0.

sps_b_slice_allowed_flag equal to 1 specifies that there may or may not be one or more coded slices of the CLVS that have slice_type equal to 0.

sps_weighted_bipred_flag equal to 1 specifies that explicit weighted prediction may be applied to B slices referring to the SPS. sps_weighted_bipred_flag equal to 0 specifies that explicit weighted prediction is not applied to B slices referring to the SPS. When not present, the value of sps_weighted_bipred_flag is inferred to be equal to 0.

sps_bdof_enabled_flag equal to 0 specifies that the bi-directional optical flow inter prediction is disabled.

sps_bdof_enabled_flag equal to 1 specifies that the bi-directional optical flow inter prediction is enabled. When not present, the value of sps_bdof_enabled_flag is inferred to be equal to 0.

sps_smvd_enabled_flag equal to 1 specifies that symmetric motion vector difference may be used in motion vector decoding. sps_smvd_enabled_flag equal to 0 specifies that symmetric motion vector difference is not used in motion vector coding. When not present, the value of sps_smvd_enabled_flag is inferred to be equal to 0.

sps_dmvr_enabled_flag equal to 1 specifies that decoder motion vector refinement based inter bi-prediction is enabled. sps_dmvr_enabled_flag equal to 0 specifies that decoder motion vector refinement based inter bi-prediction isdisabled. When not present, the value of sps_dmvr_enabled_flag is inferred to be equal to 0.

sps_bcw_enabled_flag specifies whether bi-prediction with CU weights can be used for inter prediction. If sps_bcw_enabled_flag is equal to 0, the syntax shall be constrained such that no bi-prediction with CU weights is used in the CLVS, and bcw_idx is not present in coding unit syntax of the CLVS. Otherwise (sps_bcw_enabled_flag is equal to 1), bi-prediction with CU weights can be used in the CLVS. When not present, the value of sps_bcw_enabled_flag is inferred to be equal to 0.

. . .

7.3.2.7 Picture Header Structure Syntax

|  | Descriptor |
| --- | --- |
| picture_header_structure( ) { |  |
|   gdr_or_irap_pic_flag | u(1) |
|   if( gdr_or_irap_pic_flag ) |  |
|     gdr_pic_flag | u(1) |
|   ph_inter_slice_allowed_flag | u(1) |
|   if( ph_inter_slice_allowed_flag ) { |  |
|     if (!no_pic_partition_flag && ! ( rect_slice_flag && num_slices_in_pic_minus1 = = 0 ) ) |  |
|       ph_intra_slice_allowed_flag | u(1) |
|     if ( sps_b_slice_allowed_flag ) |  |
|       ph_b_slice_allowed_flag | u (1) |
|   } |  |
|   non_reference_picture_flag | u(1) |
| ... |  |
|   if( sps_temporal_mvp_enabled_flag ) { |  |
|     ph_temporal_mvp_enabled_flag | u(1) |
|     if( ph_temporal_mvp_enabled_flag && rpl_info_in_ph_flag ) { |  |
|       if ( ph_b_slice allowed_flag ) |  |
|         ph_collocated_from_l0_flag | u(1) |
|       if( ( ph_collocated_from_l0_flag && num_ref_entries[ 0 ][ RplsIdx[ 0 ] ] > 1 ) || ( !ph_collocated_from_l0_flag && num_ref_entries[ 1 ][ RplsIdx[ 1 ] ] > 1 ) ) |  |
|         ph_collocated_ref_idx | ue(v) |
|     } |  |
|   } |  |
| ... |  |
|   if ( ph_b_slice_allowed_flag ) |  |
|     mvd_l1_zero_flag | u(1) |
|   if( sps_fpel_mmvd_enabled_flag ) |  |
|     ph_fpel_mmvd_enabled_flag | u(1) |
|   if( sps_bdof_pic_present_flag && ph_b_slice_allowed_flag ) |  |
|     ph_disable_bdof_flag | u(1) |
|   if( sps_dmvr_pic_present_flag && ph_b_slice_allowed_flag ) |  |
|     ph_disable_dmvr_flag | u(1) |
|   if( sps_prof pic_present_flag ) |  |
|     ph_disable_prof_flag | u(1) |
|   if( ( pps_weighted_pred_flag || pps_weighted_bipred_flag ) && wp_info_in_ph_flag ) |  |
|     pred_weight_table( ) |  |
|   } |  |
| ... |  |

. . .

ph_intra_slice_allowed_flag equal to 0 specifies that all coded slices of the picture have slice_type equal to 0 or 1. ph_intra_slice_allowed_flag equal to 1 specifies that there may or may not be one or more coded slices in the picture that have slice_type equal to 2. When not present, the value of ph_intra_slice_allowed_flag is inferred to be equal to [[1(!no_pic_partition_flag && ! (rect_slice_flag && num_slices_in_pic_minus1==0))?1:0.

Alternatively, when not present, the value of ph_intra_slice_allowed_flag is inferred to be equal to [[1]] (no_pic_partition_flag||(rect_slice_flag && num_slices_in_pic_minus1==0))? 0:1.

ph_b_slice_allowed_flag equal to 0 specifies that all coded slices of the picture have slice_type equal to 1 or 2. ph_b_slice_allowed_flag equal to 1 specifies that there may or may not be one or more coded slices in the picture that have slice_type equal to 0. When not present, the value of ph_b_slice_allowed_flag is inferred to be equal to 0.

> NOTE—ph_b_slice_allowed_flag equal to 0 and ph_intra_slice_allowed_flag equal to 0 indicates that all coded slices of the picture have slice_type equal to 1.

. . .

ph_collocated_from_l0_flag equal to 1 specifies that the collocated picture used for temporal motion vector prediction is derived from reference picture list 0. ph_collocated_from_l0_flag equal to 0 specifies that the collocated picture used for temporal motion vector prediction is derived from reference picture list 1. When ph_temporal_mvp_enabled_flag and rpl_info_in_ph_flag are both equal to 1 and ph_b_slice_allowed_flag is equal to 0, the value of ph_collocated_from_l0_flag is inferred to be equal to 1.

ph_collocated_ref_idx specifies the reference index of the collocated picture used for temporal motion vector prediction.

When ph_collocated_from_l0_flag is equal to 1, ph_collocated_ref_idx refers to an entry in reference picture list 0, and the value of ph_collocated_ref_idx shall be in the range of 0 to num_ref_entries[0][RplsIdx[0]]−1, inclusive.

When ph_collocated_from_l0_flag is equal to 0, ph_collocated_ref_idx refers to an entry in reference picture list 1, and the value of ph_collocated_ref_idx shall be in the range of 0 to num_ref_entries[1][RplsIdx[1]]−1, inclusive.

When not present, the value of ph_collocated_ref_idx is inferred to be equal to 0.

. . .

mvd_l1_zero_flag equal to 1 indicates that the mvd_coding (x0, y0, 1) syntax structure is not parsed and MvdL1[x0][y0][compIdx] and MvdCpL1[x0][y0][cpIdx][compIdx] are set equal to 0 for compIdx=0..1 and cpIdx=0..2. mvd_l1_zero_flag equal to 0 indicates that the mvd_coding (x0, y0, 1) syntax structure is parsed. When ph_inter_slice_allowed_flag is equal to 1 and ph_b_slice_allowed_ flag is equal to 0, the value of mvd_l1_zero_flag is inferred to be equal to 1.

FIG. 1 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 1900 may include a coding component 1904 that may implement the various coding or encoding methods described in the present document. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present document may be embodied in various electronic devices such as mobile phones, laptops, smartphones or other devices that are capable of performing digital data processing and/or video display.

Figure 2:
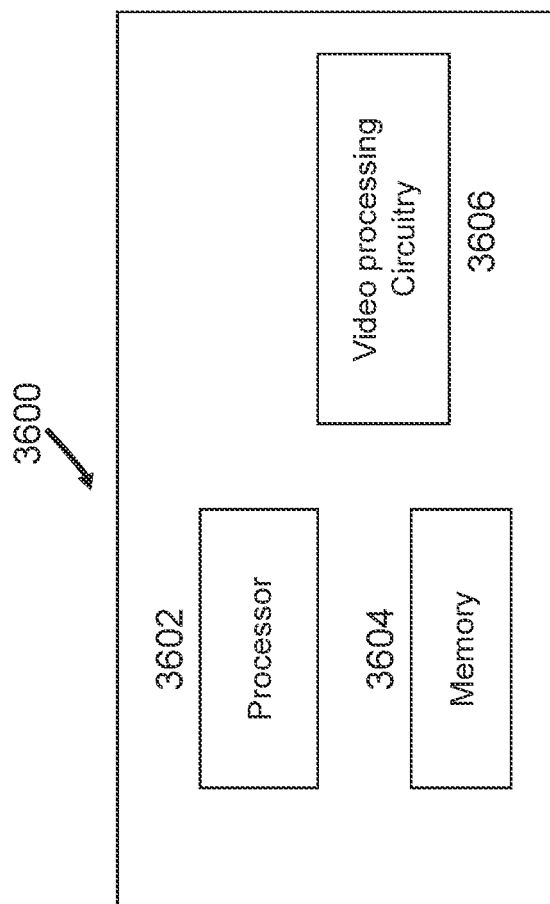
FIG. 2 is a block diagram of a video processing apparatus.

FIG. 2 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present document. The memory (memories) 3604 may be used for storing data and code used for implementing the methods and techniques described herein. The video processing hardware 3606 may be used to implement, in hardware circuitry, some techniques described in the present document.

Figure 4:
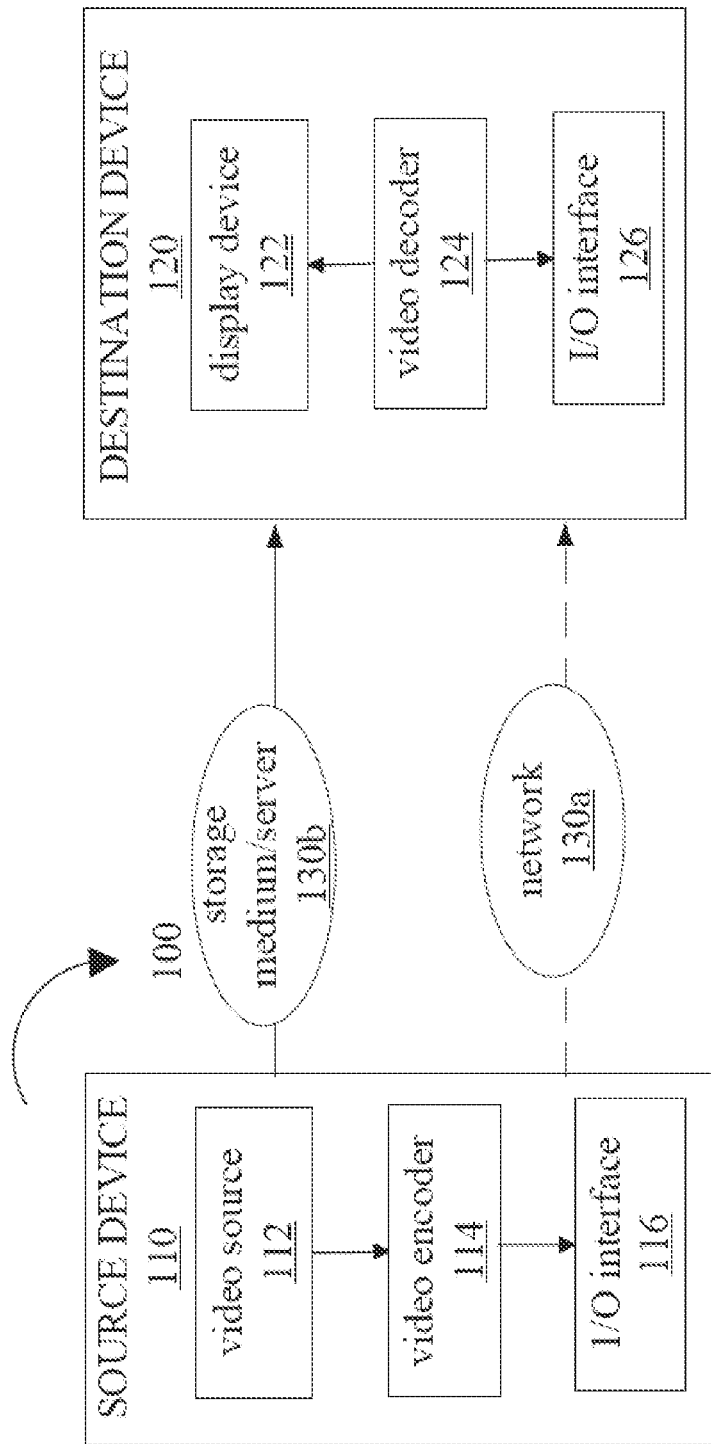
FIG. 4 is a block diagram that illustrates a video coding system in accordance with some embodiments of the present disclosure.

FIG. 4 is a block diagram that illustrates an example video coding system 100 that may utilize the techniques of this disclosure.

As shown in FIG. 4, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 5:
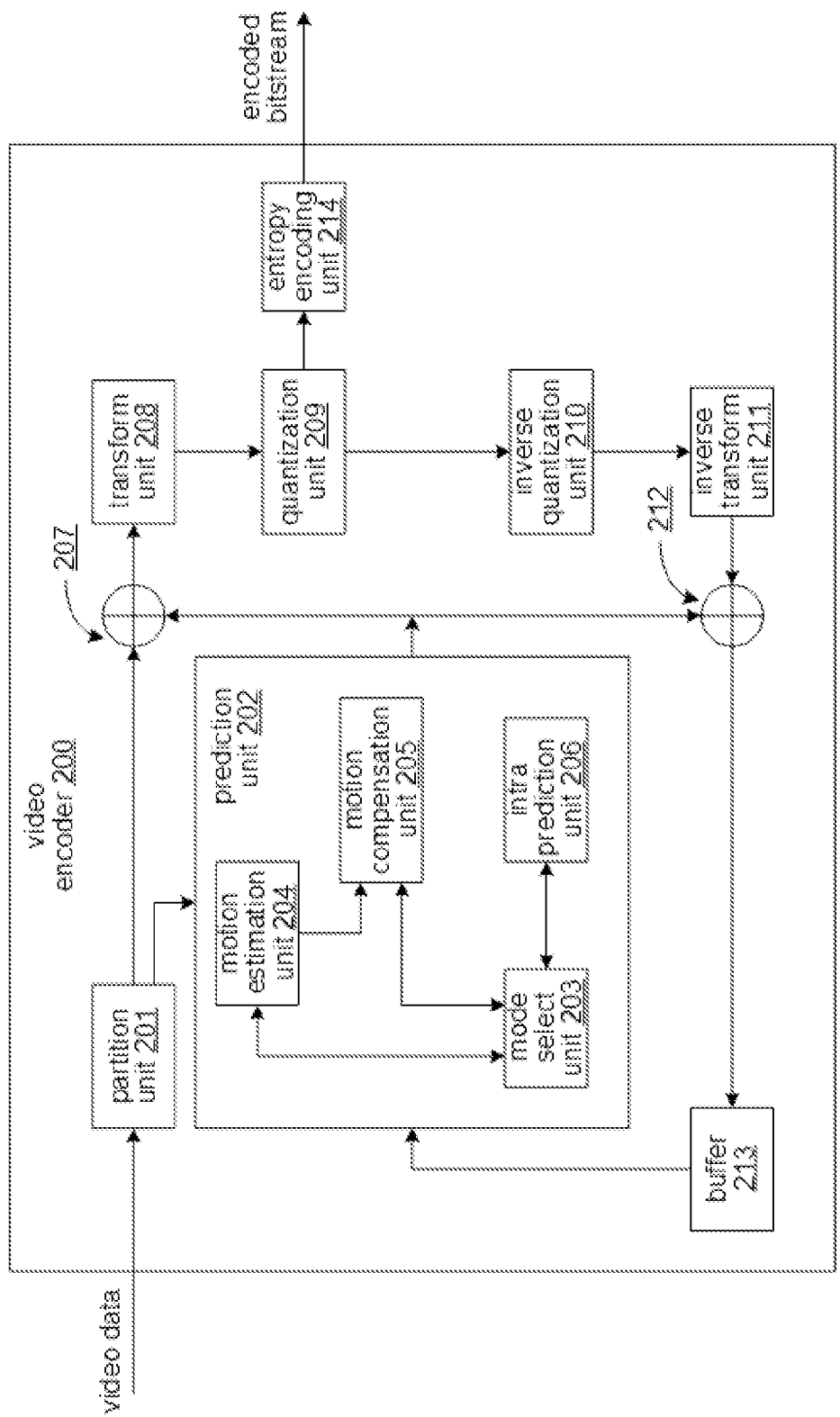
FIG. 5 is a block diagram that illustrates an encoder in accordance with some embodiments of the present disclosure.

FIG. 5 is a block diagram illustrating an example of video encoder 200, which may be video encoder 114 in the system 100 illustrated in FIG. 4.

Video encoder 200 may be configured to perform any or all of the techniques of this disclosure. In the example of FIG. 5, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a prediction unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 5 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter-prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector prediction (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 6:
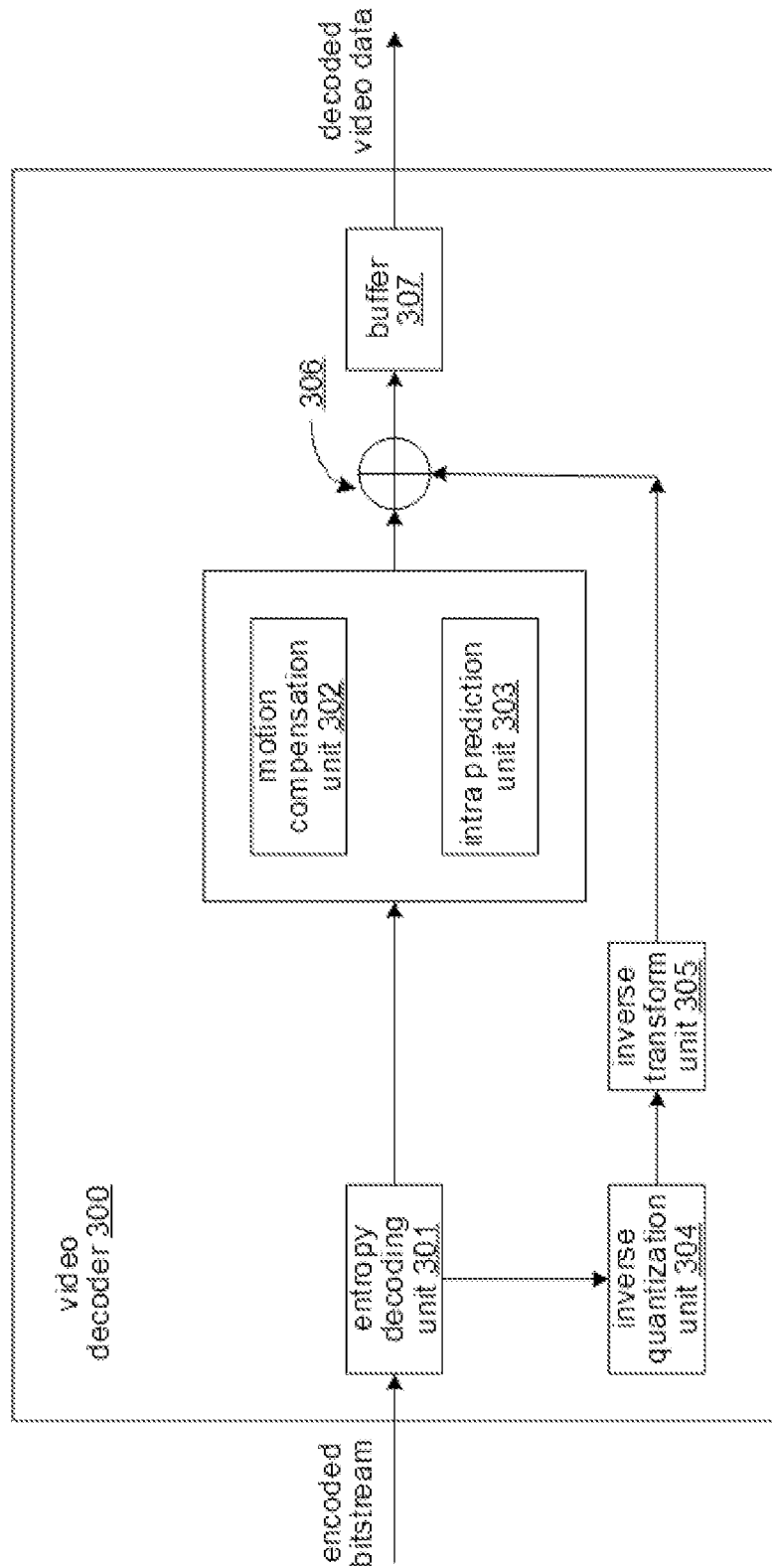
FIG. 6 is a block diagram that illustrates a decoder in accordance with some embodiments of the present disclosure.

FIG. 6 is a block diagram illustrating an example of video decoder 300 which may be video decoder 124 in the system 100 illustrated in FIG. 4.

The video decoder 300 may be configured to perform any or all of the techniques of this disclosure. In the example of FIG. 6, the video decoder 300 includes a plurality of functional components. The techniques described in this disclosure may be shared among the various components of the video decoder 300. In some examples, a processor may be configured to perform any or all of the techniques described in this disclosure.

In the example of FIG. 6, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 5).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 302 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

A listing of examples preferred by some embodiments is provided next.

The first set of clauses show example embodiments of techniques discussed in the previous section. The following clauses show example embodiments of techniques discussed in the previous section (e.g., item 1).

Figure 3:
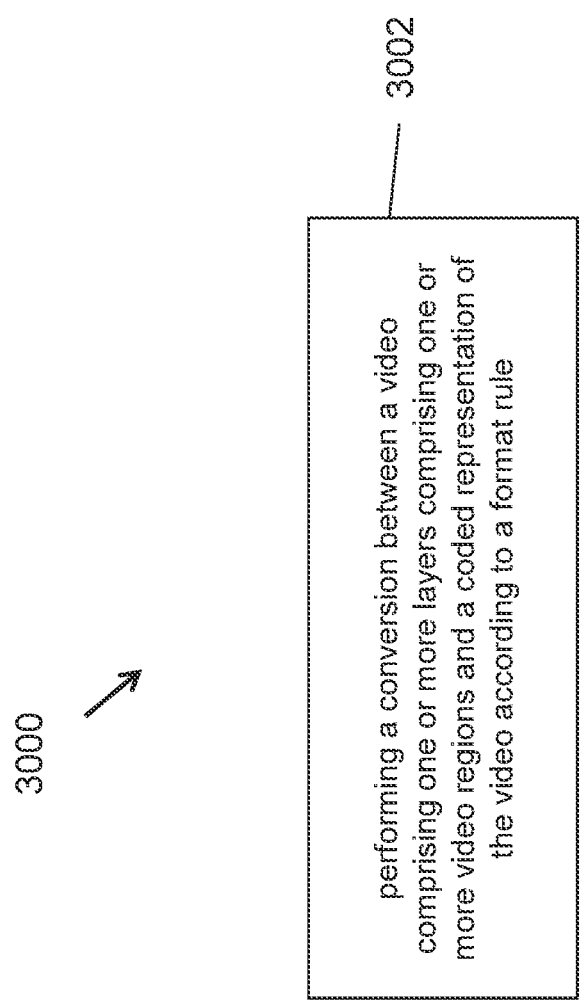
FIG. 3 is a flowchart for an example method of video processing.

1. A video processing method (e.g., method 3000 shown in FIG. 3), comprising performing (3002) a conversion between a video comprising one or more layers comprising one or more video regions and a coded representation of the video according to a format rule, wherein the format rule specifies that one or more syntax elements are included in the coded representation at the one or more video region level corresponding to allowed slice types for a corresponding video region.

2. The method of clause 1, wherein the format rule specifies that the one or more syntax elements include a first syntax element whose value is indicative of slice type combinations allowed in the corresponding video region.

The following clauses show example embodiments of techniques discussed in the previous section (e.g., item 2).

3. The method of any of clauses 1-2, wherein the format rule specifies that a syntax element is included in a picture header or a slice header to indicate whether bidirectionally predicted (B) slices ae allowed or used for a corresponding picture or a slice.

4. The method of clause 3, wherein a syntax element in a sequence parameter set controls presence of the syntax element included in the picture header or the slice header.

The following clauses show example embodiments of techniques discussed in the previous section (e.g., item 3).

5. A video processing method, comprising: performing a conversion between a video comprising one or more layers comprising one or more video pictures comprising one or more video slices and a coded representation of the video according to a format rule, wherein the format rule specifies that syntax elements related to enablement or use of a coding mode at a slice level are included at most once between either a picture header or a slice header according to a second rule.

6. The method of clause 5, wherein the coding mode includes an in-loop filter or a weighted prediction mode or a quantization parameter delta mode.

The following clauses show example embodiments of techniques discussed in the previous section (e.g., item 7).

7. A video processing method, comprising: performing a conversion between a video comprising one or more video pictures comprising one or more video slices and a coded representation of the video according to a format rule, wherein the format rule specifies that allowed slice types in a video picture controls whether a reference picture list is signaled in or generatable from the coded representation.

8. The method of clause 7, wherein the format rule specifies that due to the allowed slice types excluding bidirectional slices (B-slices), syntax elements corresponding to a reference picture list 1 are omitted from the coded representation.

9. The method of clause 7, wherein the format rule specifies that due to the allowed slice types excluding bidirectional slices (B-slices), a procedure for generation of a reference picture list 1 is disabled for a video picture.

The following clauses show example embodiments of techniques discussed in the previous section (e.g., items 10-15).

10. A video processing method, comprising: performing a conversion between a video comprising one or more video pictures comprising one or more subpictures wherein the coded representation conforms to a format rule, wherein the format rule specifies a processing of a noncoded subpicture of a video picture.

11. The method of clause 10, wherein the format rule specifies that a boundary of the noncoded subpicture is processed as a picture boundary during the conversion.

12. The method of clause 10, wherein the format rule specifies to disable a loop filtering across a boundary of the noncoded picture.

13. The method of clause 10, wherein the format rule disallows the noncoded subpicture to be only subpicture of the video picture.

14. The method of any of clauses 10-13, wherein the format rule specifies that information for decoding assistance of the noncoded subpicture is includes in a supplementary enhancement information syntax element of the coded representation.

15. The method of clause 10, wherein the format rule specifies that the noncoded subpicture is allowed to have at most one slice.

The following clauses show example embodiments of techniques discussed in the previous section (e.g., items 20-22).

16. A video processing method, comprising: performing a conversion between a video comprising one or more video pictures comprising one or more subpictures and a coded representation of the video; wherein the one or more video pictures and/or the one or more subpictures are inserted into the coded representation according to an order rule, wherein the order rule specifies a relationship between a position of a current instantaneous decoder refresh picture (IDR) or a current IDR subpicture in the coded representation.

17. The method of clause 16, wherein the order rule specifies that, the coded representation does not include any picture referred to by an entry in a reference picture list of the current IDR picture that precedes a preceding intra random access point picture in an order.

18. The method of clauses 16-17, wherein the order rule specifies that, the coded representation does not include any picture referred to by an entry in a reference picture list of the current IDR picture that precedes a preceding intra random access point picture in an order and having a subpicture having a same layer id and a same subpicture index as the current IDR subpicture.

The following clauses show example embodiments of techniques discussed in the previous section (e.g., items 23-24).

19. A video processing method, comprising: performing a conversion between a video comprising one or more video pictures comprising one or more subpictures and/or one or more slices and a coded representation of the video, wherein the coded representation conforms to a format rule, wherein the format rule specifies that an indication of whether a slice type is allowed in a picture is selectively included in the coded representation based on a picture condition of the picture.

20. The method of clause 19, wherein the picture condition comprises a layout of slices in the picture.

21. The method of clauses 19-20, wherein the picture condition comprises whether the picture is an intra random access point picture and whether inter layer dependency is permitted for the conversion.

22. The method of any of clauses 19-21, wherein the picture condition comprises a number of reference pictures used for coding the picture.

23. The method of any of clauses 19-22, wherein the slice type comprises an intra coded slice, an inter coded slice, a B slice or a P slice.

The following clauses show example embodiments of techniques discussed in the previous section (e.g., item 25).

24. A video processing method, comprising: performing a conversion between a video comprising one or more video pictures comprising one or more subpictures and/or one or more slices and a coded representation of the video, wherein the coded representation conforms to a format rule, wherein the format rule specifies that one of at least four syntax elements is set to 1 in case that an adaptive loop filter is signaled in an adaptation parameter set in the coded representation.

25. The method of clause 24, wherein the at least four syntax elements include a luma filter signal flag, a chroma filter signal flag, a cc and cb filter signal flag and a cc and cr signal flag.

The following clauses show example embodiments of techniques discussed in the previous section (e.g., item 33).

26. A video processing method, comprising: performing a conversion between a video comprising one or more video units comprising one or more slices and a coded representation of the video, wherein the coded representation conforms to a format rule, wherein the format rule specifies that a quantization parameter offset value is specified for a joint chroma residual coding used for the one or more slices at the video unit level in the coded representation.

27. The method of clause 26, wherein the video unit corresponds to a video picture, a video sequence, a sequence parameter set, a video parameter set, a picture header, a picture parameter set or a decoding capability information syntax structure.

28. The method of the above clauses, wherein the video region comprises a video picture or a video slice.

29. The method of any of clauses 1 to 28, wherein the conversion comprises encoding the video into the coded representation.

30. The method of any of clauses 1 to 28, wherein the conversion comprises decoding the coded representation to generate pixel values of the video.

31. A video decoding apparatus comprising a processor configured to implement a method recited in one or more of clauses 1 to 30.

32. A video encoding apparatus comprising a processor configured to implement a method recited in one or more of clauses 1 to 30.

33. A computer program product having computer code stored thereon, the code, when executed by a processor, causes the processor to implement a method recited in any of clauses 1 to 30.

34. A method, apparatus or system described in the present disclosure.

A second set of clauses show example embodiments of techniques discussed in the previous section (e.g., items 20-35).

1. A method of video processing (e.g., method 700 as shown in FIG. 7A), comprising: performing 702 a conversion between a video comprising one or more pictures comprising one or more subpictures and a bitstream of the video, wherein the one or more pictures and/or the one or more subpictures are included into the bitstream according to an order rule, wherein the order rule specifies a relationship between a position of a current instantaneous decoder refresh (IDR) picture or a current IDR subpicture in the bitstream with respect to another picture referred to by an entry in a reference picture list for a current slice of the current IDR picture or the current IDR subpicture.

2. The method of clause 1, wherein the order rule specifies that in response to a condition being satisfied, the bitstream does not include any picture referred to by the entry in the reference picture list for the current slice that precedes, in an output order or a decoding order, an intra random access point (IRAP) picture preceding the current IDR picture in a decoding order.

3. The method of clause 2, wherein the condition comprises that a presence flag indicates that RPL (reference picture list) syntax elements are allowed to be present in slice headers of slices with a NAL (network abstraction layer) unit type equal to IDR_N_LP or IDR_W_RADL.

4. The method of clause 2, wherein the condition comprises that a presence flag indicates that RPL (reference picture list) syntax elements are not present in slice headers of slices with a NAL (network abstraction layer) unit type equal to IDR_N_LP or IDR_W_RADL.

5. The method of any of clauses 2 to 4, wherein the current IDR picture and the IRAP picture have NAL (network abstraction layer) unit header layer identifiers equal to a particular value.

6. The method of clause 1, wherein the order rule specifies that the bitstream does not include any picture referred to by a second entry in a second reference picture list for a second slice of a clean random access picture that precedes, in an output order or a decoding order, a second intra random access point (IRAP) picture preceding the clean random access picture in a decoding order.

7. The method of clause 1, wherein the order rule specifies that in response to a condition being satisfied, the bitstream does not include any picture referred to by the entry in the reference picture list for the current slice that precedes, in an output order or a decoding order, any picture that contains an intra random access point (IRAP) subpicture and precedes the picture containing the current IDR subpicture in the decoding order.

8. The method of clause 7, wherein the condition comprises that a presence flag indicates that RPL (reference picture list) syntax elements are allowed to be present in slice headers of slices with a NAL (network abstraction layer) unit type equal to IDR_N_LP or IDR_W_RADL.

9. The method of clause 7, wherein the condition comprises that a presence flag indicates that RPL (reference picture list) syntax elements is not present in slice headers of slices with a NAL (network abstraction layer) unit type equal to IDR_N_LP or IDR_W_RADL.

10. The method of any of clauses 7 to 9, wherein the IRAP subpicture and the current IDR subpicture have NAL (network abstraction layer) unit header layer identifiers equal to a particular identification value and subpicture indices equal to a particular index value.

11. The method of clause 1, wherein the order rule specifies the bitstream does not include any picture referred to by a third entry in the reference picture list for a third slice of a clean random access picture subpicture that precedes, in an output order or a decoding order, any picture that contains a third intra random access point (IRAP) subpicture and precedes the picture containing the clean random access picture subpicture in the decoding order.

12. A method of video processing (e.g., method 710 as shown in FIG. 7B), comprising: performing 712 a conversion between a video comprising one or more pictures comprising one or more subpictures and/or one or more slices and a bitstream of the video according to a format rule, and wherein the format rule allows an inclusion of an indication of an access unit indicating whether the access unit is an intra random access point (IRAP) access unit or a gradual decoding refresh (GDR) access unit for each access unit in the video.

13. The method of clause 12, wherein the IRAP access unit is not required to be complete and includes at least one IRAP pictures.

14. The method of clause 12, wherein the GDR access unit is not required to be complete and includes at least one GDR pictures.

15. The method of clause 12, wherein the format rule specifies to include the indication in an access unit delimiter, a picture header of pictures in a lowest layer specified by a video parameter set.

16. A method of video processing (e.g., method 720 as shown in FIG. 7C), comprising: performing 722 a conversion between a video comprising one or more pictures comprising one or more subpictures and/or one or more slices and a bitstream of the video according to a format rule, and wherein the format rule specifies that an indication of whether a slice type is allowed in a picture is selectively included in the bitstream based on a picture condition of the picture.

17. The method of clause 16, wherein the slice type comprises an intra coded slice, an inter coded slice, a B slice or a P slice.

18. The method of clause 16 or 17, wherein the picture condition comprises a layout of slices in the picture.

19. The method of any of clauses 16 to 18, wherein the picture condition comprises whether the picture is an intra random access point (IRAP) picture and whether inter layer dependency is permitted for the conversion.

20. The method of any of clauses 16 to 19, wherein the picture condition comprises i) whether a picture parameter set indicates that only slice per picture is applied and/or ii) no picture partition is used and/or iii) a rectangular slice and only one slice per picture are used and/or iv) the picture is partitioned into rectangular slices.

21. The method of any of clauses 16 to 19, wherein the picture condition comprises one or more syntax elements signaled in a higher level video unit.

22. The method of clause 16 or 17, wherein the picture condition comprises a number of reference pictures used for coding the picture.

23. The method of clause 22, wherein the number of reference pictures is based on a first field indicating a number of entries in a first reference picture list syntax structure and/or a second field indicating a number of entries in a second reference picture list syntax structure.

Figure 7D:
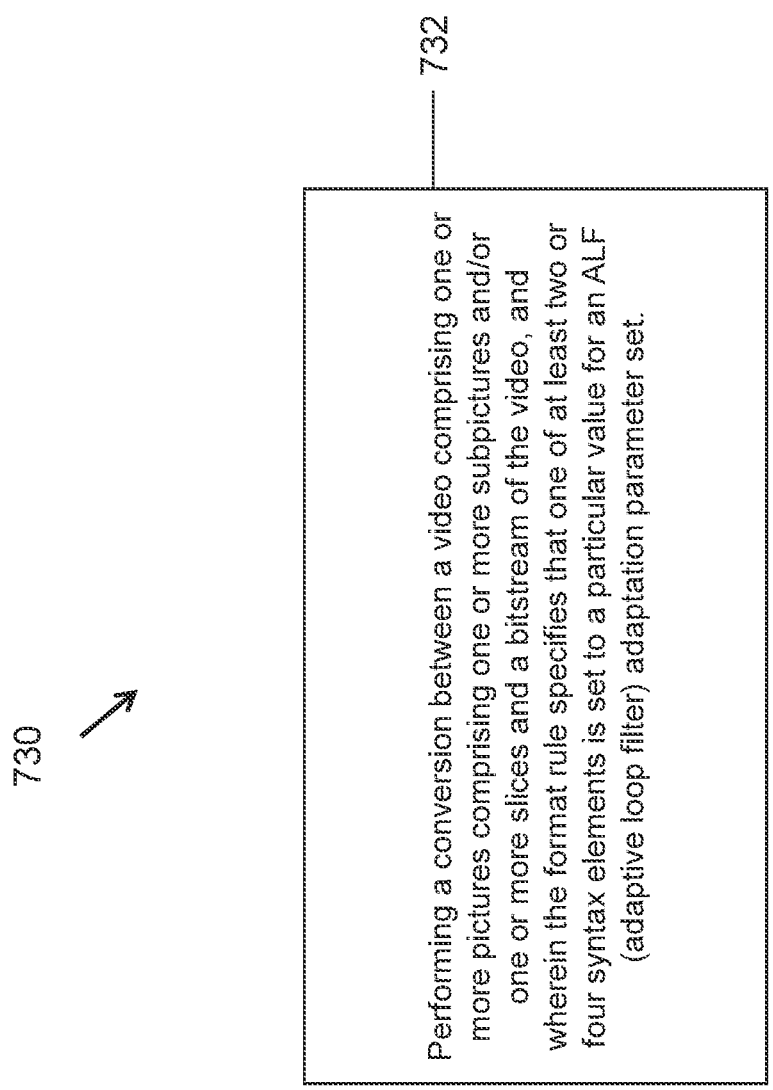

24. A method of video processing (e.g., method 730 as shown in FIG. 7D), comprising: performing 732 a conversion between a video comprising one or more pictures comprising one or more subpictures and/or one or more slices and a bitstream of the video, wherein the format rule specifies that one of at least two or four syntax elements is set to a particular value for an ALF (adaptive loop filter) adaptation parameter set.

25. The method of clause 24, wherein the at least four syntax elements includes a luma filter signal flag specifying whether a luma filter set is signalled, a chroma filter signal flag specifying whether a chroma filter is signalled, a cc and cb filter signal flag specifying whether cross-component filters for Cb color component are signalled, and a cc and cr signal flag specifying whether cross-component filters for Cr color component are signalled.

26. A method of video processing (e.g., method 740 as shown in FIG. 7E), comprising: performing 742 a conversion between a video comprising one or more pictures and a bitstream of the video according to a format rule, and wherein the format rule specifies that whether and/or how to signal an indication of filter present flags and/or filter coefficients depends on previously coded information with an adaptive loop filtering data structure and/or syntax elements in an adaptation parameter set RBSP (raw byte sequence payload) syntax.

27. The method of clause 26, wherein the format rule further specifies, in case that the indication is not present, to infer a value of the indication based on the previously coded information with the adaptive loop filtering data structure.

28. The method of clause 26, wherein the format rule further specifies whether to signal a cc and cr filter signal flag specifying whether cross-component filters for Cr color component are signalled depends on whether all three syntax elements are equal to a certain value or not, the three syntax elements including a luma filter signal flag specifying whether a luma filter set is signalled, a chroma filter signal flag specifying whether a chroma filter is signalled, and a cc and cb filter signal flag specifying whether cross-component filters for Cb color component are signalled.

29. The method of clause 26, wherein the format rule further specifies whether to signal a chroma filter signal flag specifying whether a chroma filter is signalled depends on a value of a luma filter signal flag specifying whether a luma filter set is signalled.

Figure 7F:
Figure 71:

30. A method of video processing (e.g., method 750 as shown in FIG. 7F), comprising: performing 752 a conversion between a video comprising one or more pictures and a bitstream of the video according to a format rule, and wherein the format rule allows, for a video region smaller than a picture, to refer to multiple adaptation parameter sets (APSs) corresponding to coding tools whose side information is included in the APSs.

31. The method of clause 30, wherein the multiple APSs include a scaling APS, LMCS (luma mapping with chroma scaling) APS, and/or an APS corresponding to other coding tools.

32. The method of clause 30, wherein the format rule specifies that the bitstream includes a number of the multiple APSs to be referred.

33. The method of clause 30, wherein the format rule specifies that the bitstream includes indices of the multiple APSs to be referred.

34. The method of clause 30, wherein the format rule further specifies that the multiple APSs to be used for the conversion are dependent on a color component of the video.

35. The method of clause 34, wherein the format rule further specifies to use different APSs for a luma component and a chroma component of the video.

36. The method of clause 34, wherein the format rule further specifies that numbers and/or indices of the multiple APSs to be utilized for a luma component and a chroma component are separately signalled in the bitstream.

37. The method of clause 30, wherein the format rule further specifies that how to signal the multiple APSs to be used is dependent on a subpicture of the picture.

38. The method of clause 30, wherein the format rule further specifies that an on/off control and/or the multiple APSs to be used is selected or signalled for each subpicture.

39. A method of video processing (e.g., method 760 as shown in FIG. 7G), comprising: performing 762 a conversion between a video comprising one or more pictures comprising one or more subpictures and a bitstream of the video according to a format rule, and wherein the format rule specifies how to infer a value of a first variable indicating whether a subpicture of a coded picture is treated as a picture in a decoding process excluding in-loop filtering operations depends on a second variable indicating a presence of subpicture information in the bitstream.

40. The method of clause 39, wherein the format rule specifies that, in case that the first variable is not present, the value of the first variable is inferred to be equal to a value of the second variable.

41. A method of video processing (e.g., method 770 as shown in FIG. 7H), comprising: performing 772 a conversion between a video comprising one or more pictures comprising one or more subpictures and a bitstream of the video according to a format rule, and wherein the format rule specifies that, in response to one or more conditions being satisfied, a variable indicating an applicability of a deblocking filter to pictures referring to a picture parameter set has a first value to indicate that the deblocking filter is applied to slices referring to the picture parameter set or a second value to indicate that the deblocking filter is disabled to a slice referring to the picture parameter set.

42. The method of clause 41, wherein the first value is 1 and the second value is 0.

43. The method of clause 42, wherein the one or more conditions include 1) deblocking filter disabled flags in a slice level and a picture header level that indicate a disablement of the deblocking filter are not present, 2) a deblocking filter override enabled flag indicates that a deblocking behavior for pictures referring to the picture parameter set is not overridden, 3) the deblocking filter override enabled flag indicates that the deblocking behavior for pictures referring to the picture parameter set is allowed to be overridden, a deblocking filter presence flag indicates that deblocking filter information is present in a picture header syntax structure, and a deblocking filter disabled flag in a picture header level indicates that the deblocking filter is disabled for a picture, or 4) the deblocking filter override enabled flag indicates that the deblocking behavior for pictures referring to the picture parameter set is allowed to be overridden, a deblocking filter presence flag indicates that deblocking filter information is present in a picture header syntax structure, and a deblocking filter disabled flag in a slice level indicates that the deblocking filter is disabled for the picture.

44. The method of clause 41, wherein the first value is 0 and the second value is 0.

45. The method of clause 44, wherein the one or more conditions include 1) deblocking filter disabled flags in a slice level and a picture header level that indicate a disablement of the deblocking filter are not present, 2) a deblocking filter override enabled flag indicates that a deblocking behavior for pictures referring to the picture parameter set is not overridden, 3) the deblocking filter override enabled flag indicates that the deblocking behavior for pictures referring to the picture parameter set is allowed to be overridden, a deblocking filter presence flag indicates that deblocking filter information is present in a picture header syntax structure, and a deblocking filter disabled flag in a picture header level indicates that the deblocking filter is enabled for a current picture, or 4) the deblocking filter override enabled flag indicates that the deblocking behavior for pictures referring to the picture parameter set is allowed to be overridden, a deblocking filter presence flag indicates that deblocking filter information is not present in a picture header syntax structure, and a deblocking filter disabled flag in a slice level indicates that the deblocking filter is enabled for the picture.

46. A video processing method (e.g., method 780 as shown in FIG. 7I), comprising: performing 782 a conversion between a video comprising one or more video units comprising one or more slices and a bitstream of the video according to a format rule, wherein the format rule specifies that a quantization parameter offset value used for a joint chroma residual coding is included in one or more video unit levels that are larger than a slice level.

47. The method of clause 46, wherein the one or more video units correspond to a video picture, a video sequence, a sequence parameter set, a video parameter set, a picture header, a picture parameter set or a decoding capability information syntax structure.

48. The method of clause 46, wherein the one or more video unit levels include a first level and a second level and wherein the format rule further specifies whether to signal the quantization parameter offset value in the second level depends on whether the quantization parameter offset value is signalled in the first level.

49. The method of clause 46, wherein the one or more video unit levels include a first level and a second level lower than the first level and wherein the format rule further specifies that the quantization parameter offset value is signalled in the first level and an override flag is signalled to indicate whether to signal the quantization parameter offset value in the second level to override a signalled value in the first level.

50. A method of video processing (e.g., method 790 as shown in FIG. 7J), comprising: performing 792 a conversion between a video comprising one or more pictures and a bitstream of the video according to a format rule, and wherein the format rule specifies (i) a fixed or variable length of one or more bits used to code a variable indicating a LMCS (luma mapping with chroma scaling) mode identification in a picture header level, and (ii) a range of a value of the variable.

51. The method of clause 50, wherein the format rule specifies that the variable is coded using ue(v) and that the range of the value of the variable is between 0 to 2, inclusive.

52. The method of clause 50, wherein the format rule specifies that the variable is coded using ue(v) and that the range of the value of the variable is between 0 to 1, inclusive, in case that a picture contains only one slice and otherwise the range is between 0 to 2, inclusive.

53. The method of clause 50, wherein the format rule specifies that in case that a picture contains only one slice, the variable is coded using u(1) such that the value of the variable is 0 or 1 and otherwise, the variable is coded using ue(v) such that the range of the value of the variable is between 0 to 2, inclusive.

Figure 7K:
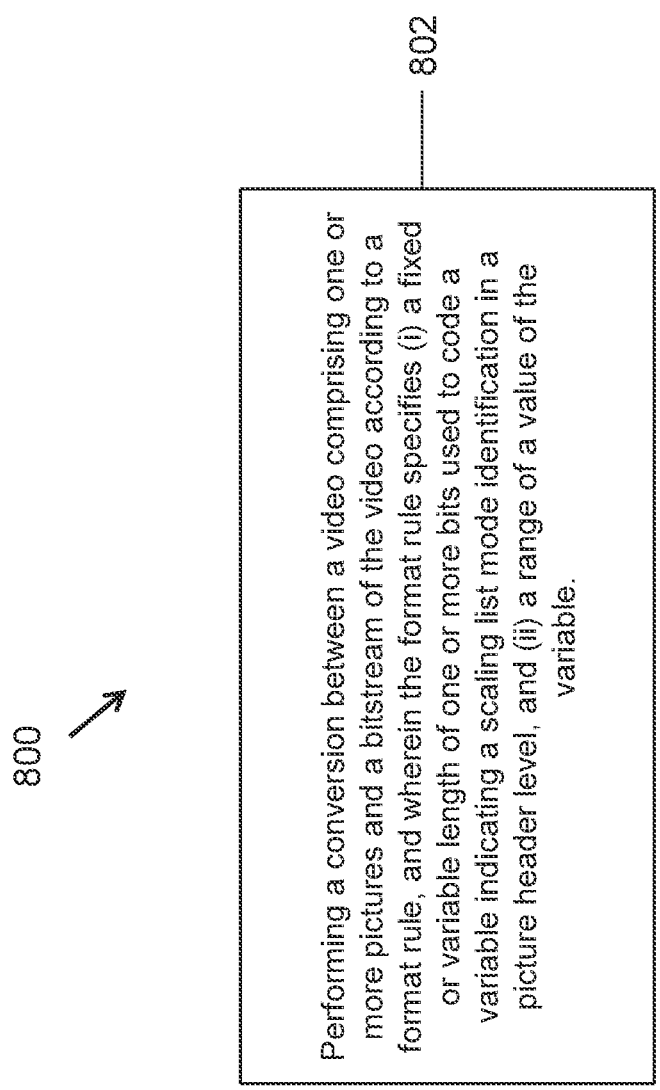

54. A method of video processing (e.g., method 800 as shown in FIG. 7K), comprising: performing 802 a conversion between a video comprising one or more pictures and a bitstream of the video according to a format rule, and wherein the format rule specifies (i) a fixed or variable length of one or more bits used to code a variable indicating a scaling list mode identification in a picture header level, and (ii) a range of a value of the variable.

55. The method of clause 54, wherein the format rule specifies that the variable is coded using ue(v) and that the range of the value of the variable is between 0 to 2, inclusive.

56. The method of clause 54, wherein the format rule specifies that the variable is coded using ue(v) and that the range of the value of the variable is between 0 to 1, inclusive, in case that a picture contains only one slice and otherwise the range is between 0 to 2, inclusive.

57. The method of clause 54, wherein the format rule specifies that in case that a picture contains only one slice, the variable is coded using u(1) such that the value of the variable is 0 or 1 and otherwise, the variable is coded using ue(v) such that the range of the value of the variable is between 0 to 2, inclusive.

58. The method of any of clauses 1 to 57, wherein the conversion includes encoding the video into the bitstream.

59. The method of any of clauses 1 to 57, wherein the conversion includes decoding the video from the bitstream.

60. The method of clauses 1 to 57, wherein the conversion includes generating the bitstream from the video, and the method further comprises: storing the bitstream in a non-transitory computer-readable recording medium.

61. A video processing apparatus comprising a processor configured to implement a method recited in any one or more of clauses 1 to 60.

62. A method of storing a bitstream of a video, comprising, a method recited in any one of clauses 1 to 60, and further including storing the bitstream to a non-transitory computer-readable recording medium.

63. A computer readable medium storing program code that, when executed, causes a processor to implement a method recited in any one or more of clauses 1 to 60.

64. A computer readable medium that stores a bitstream generated according to any of the above described methods.

65. A video processing apparatus for storing a bitstream representation, wherein the video processing apparatus is configured to implement a method recited in any one or more of clauses 1 to 60.

In the present disclosure, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of particular techniques. Certain features that are described in this present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

What is claimed is:

1. A method of video processing, comprising:
performing a conversion between a video comprising one or more pictures and a bitstream of the video,
wherein the one or more pictures are included into the bitstream according to a first order rule,
wherein the first order rule specifies that in response to a first condition being satisfied, the bitstream does not include any picture, which precedes, in an output order or a decoding order, an intra random access point (IRAP) picture preceding a current instantaneous decoding refresh (IDR) picture in the decoding order and is referred to by an entry in a reference picture list for a current slice of the current IDR picture,
wherein the first condition comprises that a presence flag in a sequence parameter set level related with IDR reference picture list syntax elements is equal to a predefined value, and
wherein the current IDR picture comprises one or more IDR subpictures, wherein the bitstream conforms to a second order rule, wherein the second order rule specifies that in response to a second condition being satisfied, the bitstream does not include any picture referred to by an entry in a reference picture list for a current slice of a current IDR subpicture that precedes, in the output order or the decoding order, any picture that contains an IRAP subpicture and precedes the picture containing the current IDR subpicture in the decoding order.

2. The method of claim 1, wherein the predefined value is 1.

3. The method of claim 1, wherein the first condition comprises that the presence flag indicates that reference picture list (RPL) syntax elements are allowed to be present in slice headers of slices with a network abstraction layer (NAL) unit type equal to IDR_N_LP or IDR_W_RADL.

4. The method of claim 1, wherein the current IDR picture and the IRAP picture have network abstraction layer (NAL) unit header layer identifiers equal to a particular value.

5. The method of claim 1, wherein the first order rule specifies that the bitstream does not include any picture referred to by a second entry in a second reference picture list for a second slice of a clean random access picture that precedes, in the output order or the decoding order, a second intra random access point (IRAP) picture preceding the clean random access picture in the decoding order.

6. The method of claim 1, wherein the second condition comprises that the presence flag in the sequence parameter set level related with IDR reference picture list syntax elements is equal to the predefined value.

7. The method of claim 6, wherein the predefined value is 1.

8. The method of claim 1, wherein the second condition comprises that the presence flag indicates that reference picture list (RPL) syntax elements are allowed to be present in slice headers of slices with a network abstraction layer (NAL) unit type equal to IDR_N_LP or IDR_W_RADL.

9. The method of claim 1, wherein the IRAP subpicture and the current IDR subpicture have network abstraction layer (NAL) unit header layer identifiers equal to a particular identification value and subpicture indices equal to a particular index value.

10. The method of claim 1, wherein the second order rule specifies that the bitstream does not include any picture referred to by a third entry in a third reference picture list for a third slice of a clean random access subpicture that precedes, in the output order or the decoding order, any picture that contains a third IRAP subpicture and precedes a picture containing the clean random access subpicture in the decoding order.

11. The method of claim 1, wherein the conversion includes encoding the video into the bitstream.

12. The method of claim 1, wherein the conversion includes decoding the video from the bitstream.

13. An apparatus for processing video data comprising a processor and a non-transitory memory with instructions thereon, wherein the instructions upon execution by the processor, cause the processor to:
perform a conversion between a video comprising one or more pictures and a bitstream of the video,
wherein the one or more pictures are included into the bitstream according to a first order rule,
wherein the first order rule specifies that in response to a first condition being satisfied, the bitstream does not include any picture, which precedes, in an output order or a decoding order, an intra random access point (IRAP) picture preceding a current instantaneous decoding refresh (IDR) picture in the decoding order and is referred to by an entry in a reference picture list for a current slice of the current IDR picture,
wherein the first condition comprises that a presence flag in a sequence parameter set level related with IDR reference picture list syntax elements is equal to a predefined value, and
wherein the current IDR picture comprises one or more IDR subpictures, wherein the bitstream conforms to a second order rule, wherein the second order rule specifies that in response to a second condition being satisfied, the bitstream does not include any picture referred to by an entry in a reference picture list for a current slice of a current IDR subpicture that precedes, in the output order or the decoding order, any picture that contains an IRAP subpicture and precedes the picture containing the current IDR subpicture in the decoding order.

14. The apparatus of claim 13, wherein the first condition comprises that the presence flag indicates that reference picture list (RPL) syntax elements are allowed to be present in slice headers of slices with a network abstraction layer (NAL) unit type equal to IDR_N_LP or IDR_W_RADL.

15. The apparatus of claim 13, wherein the current IDR picture and the IRAP picture have network abstraction layer (NAL) unit header layer identifiers equal to a particular value.

16. The apparatus of claim 13,
wherein the second condition comprises that the presence flag indicates that reference picture list (RPL) syntax elements are allowed to be present in slice headers of slices with a network abstraction layer (NAL) unit type equal to IDR_N_LP or IDR_W_RADL, and
wherein the IRAP subpicture and the current IDR subpicture have NAL unit header layer identifiers equal to a particular identification value and subpicture indices equal to a particular index value.

17. The apparatus of claim 13, wherein the predefined value is 1.

18. The apparatus of claim 13, wherein the second condition comprises that the presence flag in the sequence parameter set level related with IDR reference picture list syntax elements is equal to the predefined value.

19. A non-transitory computer-readable storage medium storing instructions that cause a processor to:
perform a conversion between a video comprising one or more pictures and a bitstream of the video,
wherein the one or more pictures are included into the bitstream according to a first order rule,
wherein the first order rule specifies that in response to a first condition being satisfied, the bitstream does not include any picture, which precedes, in an output order or a decoding order, an intra random access point (IRAP) picture preceding a current instantaneous decoding refresh (IDR) picture in the decoding order and is referred to by an entry in a reference picture list for a current slice of the current IDR picture,
wherein the first condition comprises that a presence flag in a sequence parameter set level related with IDR reference picture list syntax elements is equal to a predefined value, and
wherein the current IDR picture comprises one or more IDR subpictures, wherein the bitstream conforms to a second order rule, wherein the second order rule specifies that in response to a second condition being satisfied, the bitstream does not include any picture referred to by an entry in a reference picture list for a current slice of a current IDR subpicture that precedes, in the output order or the decoding order, any picture that contains an IRAP subpicture and precedes the picture containing the current IDR subpicture in the decoding order.

20. A non-transitory computer-readable recording medium storing a bitstream of a video which is generated by a method performed by a video processing apparatus, wherein the method comprises:
generating the bitstream of the video comprising one or more pictures,
wherein the one or more pictures are included into the bitstream according to a first order rule,
wherein the first order rule specifies that in response to a first condition being satisfied, the bitstream does not include any picture, which precedes, in an output order or a decoding order, an intra random access point (IRAP) picture preceding a current instantaneous decoding refresh (IDR) picture in the decoding order and is referred to by an entry in a reference picture list for a current slice of the current IDR picture,
wherein the first condition comprises that a presence flag in a sequence parameter set level related with IDR reference picture list syntax elements is equal to a predefined value, and
wherein the current IDR picture comprises one or more IDR subpictures, wherein the bitstream conforms to a second order rule, wherein the second order rule specifies that in response to a second condition being satisfied, the bitstream does not include any picture referred to by an entry in a reference picture list for a current slice of a current IDR subpicture that precedes, in the output order or the decoding order, any picture that contains an IRAP subpicture and precedes the picture containing the current IDR subpicture in the decoding order.

* * * * *